US008126947B2

United States Patent
Yoshida et al.

(10) Patent No.: US 8,126,947 B2
(45) Date of Patent: *Feb. 28, 2012

(54) INFORMATION PROCESSING APPARATUS AND METHOD, RECORDING MEDIUM, AND PROGRAM

(75) Inventors: Satoshi Yoshida, Tokyo (JP); Isao Itoh, Tokyo (JP)

(73) Assignee: Sony Corporation, Tokyo (JP)

( * ) Notice: Subject to any disclaimer, the term of this patent is extended or adjusted under 35 U.S.C. 154(b) by 680 days.

This patent is subject to a terminal disclaimer.

(21) Appl. No.: 12/179,063

(22) Filed: Jul. 24, 2008

(65) Prior Publication Data

US 2008/0301160 A1 Dec. 4, 2008

Related U.S. Application Data

(63) Continuation of application No. 11/219,996, filed on Sep. 6, 2005, now Pat. No. 7,416,124.

(30) Foreign Application Priority Data

Sep. 29, 2004 (JP) ................................. 2004-283107

(51) Int. Cl.
*G06F 17/30* (2006.01)
(52) U.S. Cl. ..................... 707/999.01; 713/193; 726/20; 707/705; 707/723; 707/722
(58) Field of Classification Search ................... 235/492, 235/375, 382; 707/705, 722, 723, 999.01, 707/999.1; 705/28, 52, 51, 57; 713/193; 709/201, 223, 224; 710/5, 19; 700/94; 702/182, 702/188; 369/47.1
See application file for complete search history.

(56) References Cited

U.S. PATENT DOCUMENTS

| 5,629,513 | A | 5/1997 | Geronimi et al. |
| 5,901,303 | A * | 5/1999 | Chew ............................. 711/115 |
| 6,233,683 | B1 | 5/2001 | Chan et al. |
| 6,481,632 | B2 | 11/2002 | Wentker et al. |
| 6,729,549 | B2 * | 5/2004 | Hamann et al. ............... 235/492 |
| 7,155,413 | B2 * | 12/2006 | Nakai et al. ..................... 705/51 |
| 7,284,003 | B2 | 10/2007 | Honda |
| 2002/0040936 | A1 | 4/2002 | Wentker |
| 2004/0162932 | A1 | 8/2004 | Mizushima et al. |

(Continued)

FOREIGN PATENT DOCUMENTS

EP 0733992 10/1995

(Continued)

OTHER PUBLICATIONS

Japanese Office Action for corresponding JP2004-283107 issued on Jun. 22, 2010.

*Primary Examiner* — Jean M Corrielus
(74) *Attorney, Agent, or Firm* — K&L Gates LLP

(57) ABSTRACT

Information processing apparatus and method, recording medium, and program are provided. An information processing apparatus includes the following elements. A receiver receives a command requesting for the execution of predetermined processing. A storage unit stores data and first information indicating, among a plurality of stages in a lifecycle of the information processing apparatus, the current stage determined by the stored data and second information indicating an executable command in the current stage, the executable command being determined for each of the plurality of stages. A determining unit determines on the basis of the first information and the second information whether the command received by the receiver is an executable command in the current stage.

10 Claims, 16 Drawing Sheets

U.S. PATENT DOCUMENTS

2006/0101512 A1\* 5/2006 Yoshida et al. .................. 726/20
2008/0301160 A1\* 12/2008 Yoshida et al. ............... 707/100

FOREIGN PATENT DOCUMENTS

| | | |
|---|---|---|
| EP | 1079340 | 8/2000 |
| FR | 2822334 | 3/2001 |
| JP | 02-157988 | 6/1990 |
| JP | 06-131515 | 5/1994 |
| JP | 2000-036014 | 2/2000 |
| JP | 2000-307567 | 11/2000 |
| JP | 2004-094692 | 3/2004 |
| WO | 99/64996 | 12/1999 |

\* cited by examiner

FIG. 8

| MANUFACTURER SHIPMENT STAGE | 1 |
|---|---|
| ZEROTH-ORDER CARD-ISSUED STAGE | 0 |
| PRIMARY CARD-ISSUED STAGE | 0 |
| SECONDARY CARD-ISSUED STAGE | 0 |
| DISPOSAL STAGE | 0 |

FIG. 9

| STAGE | COMMAND |
|---|---|
| MANUFACTURER SHIPMENT STAGE | TRACKING COMMAND |
| | ZEROTH-ORDER ISSUE COMMAND |
| ZEROTH-ORDER CARD-ISSUED STAGE | MUTUAL AUTHENTICATION COMMAND |
| | TRACKING COMMAND |
| | PRIMARY ISSUE COMMAND |
| PRIMARY CARD-ISSUED STAGE | MUTUAL AUTHENTICATION COMMAND |
| | ALL RESET COMMAND |
| | SECONDARY ISSUE COMMAND |
| SECONDARY CARD-ISSUED STAGE | MUTUAL AUTHENTICATION COMMAND |
| | ALL RESET COMMAND |
| | DATA RESET COMMAND |
| | REGULAR OPERATION COMMAND |
| | TERMINATE COMMAND |
| DISPOSAL STAGE | |

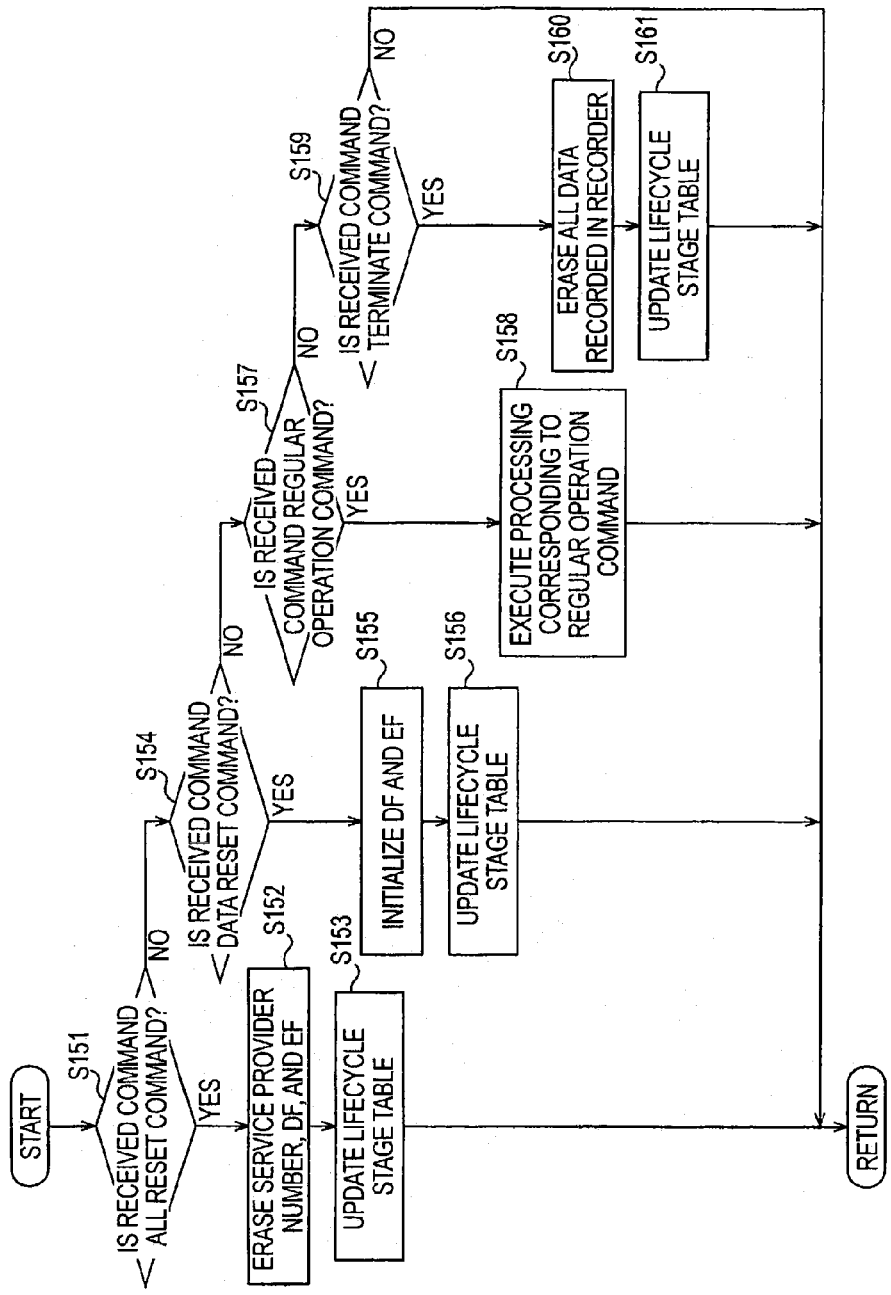

INFORMATION PROCESSING APPARATUS AND METHOD, RECORDING MEDIUM, AND PROGRAM

CROSS REFERENCES TO RELATED APPLICATIONS

The present application is a continuation of U.S. patent application Ser. No. 11/219,996, filed on Sep. 6, 2005, which claims priority to Japanese Patent Application No. 2004-283107 filed in the Japan Patent Office on Sep. 29, 2004, the entire contents of which are being incorporated herein by reference.

BACKGROUND

The present invention relates to information processing apparatuses and methods, recording media, and programs, and more particularly, to an information processing apparatus and method, a recording medium, and a program in which the tampering and leakage of data and information can be prevented.

Due to the development of information processing technologies, a large amount of information is sent and received via communication networks. For example, IC cards (smart cards) used in e-cash systems and security systems have built-in central processing units (CPUs) that perform various processing jobs and memory devices that store data required for processing. Data can be sent and received while an IC card is in electrical contact with a predetermined reader/writer.

In the lifecycle of an IC card, a new folder for storing data required for providing services is added, or a key required for accessing data is changed, that is, a so-called "card issue operation" is performed.

FIG. 1 is a flowchart illustrating the lifecycle of a known IC card.

An IC card is manufactured by a predetermined card manufacturer and is then shipped to an IC-card issuer as a raw IC card without data required for providing services or a key required for accessing data (hereinafter such a card state is referred to as the "manufacturer shipment state").

Then, the IC-card issuer performs processing, such as generating a main folder (MF) for storing data therein and recording an authentication key used for mutual authentication in the storage area of the IC card (hereinafter such processing is referred to as the "zeroth-order issue operation"). Then, the IC card is shipped to a service provider providing predetermined services to users by using the IC card as the IC card with the MF and the mutual authentication key (hereinafter such a card state is referred to as the "zeroth-order card-issued state").

Subsequently, the service provider performs processing, such as reserving a storage area (dedicated file (DF)) for providing services within the MF and writing a key required for accessing the reserved DF (hereinafter such processing is referred to as the "primary issue operation").

Then, the IC card subjected to the primary issue operation is distributed to a facility providing services to a user, for example, to an office of the service provider, as the IC card with the DF and the key for accessing the DF in the main folder (hereinafter such a card state is referred to as "primary card-issued state").

Then, in the office, processing, such as writing data, for example, personal information, required for the user to receive the services and a key required for accessing the data in the DF (hereinafter such processing is referred to as the "secondary issue operation"), is performed, and the IC card is then distributed to the user.

The user receives the services provided by the service provider by using the IC card in which the data, such as personal information, and the key for accessing the data are written (hereinafter such a card state is referred to as the "secondary card-issued state").

When the IC card is disused, it is recollected by the service provider. The service provider erases (deletes) all data stored in the recollected IC card and delivers the IC card without data (disposal state) to a disposal agent, and the disposal agent disposes of the IC card.

In this manner, in each state of the lifecycle of the IC card, the IC-card issue operation of the IC card is performed.

In some known IC cards, for example, the IC card disclosed in Japanese Unexamined Patent Application Publication No. 2000-36014, in the IC-card issue operation, encrypted card issue information sent from an IC-card issue machine is received and decrypted. That is, in this IC card, the IC-card issue operation is performed by decrypting the received card issue information and recording the decrypted card issue information.

In the above-described technology, however, although the type of processing that can be performed by the IC card is different in each state of the lifecycle of the IC card, the IC card unconditionally receives all commands including commands that should not be processed and executes all the received commands.

Additionally, the same authentication key is used for conducting mutual authentication with a communicating party in each state of the lifecycle of the IC card. Thus, it is possible that a card issuer or a service provider owning the authentication key could transmit a command that should not be processed to the IC card and allow the IC card to execute that command.

When making the IC card disposable, data recorded on the IC card can be erased or the authentication key used for mutual authentication can be changed. However, since the IC card can receive all commands including commands that should not be processed and executes all the received commands, the erased data may be disadvantageously reconstructed.

It is thus very difficult to prevent the tampering or leakage of data or information.

SUMMARY

In view of the above background, it is desirable to restrict processing to be executed in each state of the lifecycle of an IC card.

It is also desirable to conduct mutual authentication by using different authentication keys in the individual states of the lifecycle of an IC card.

According to an embodiment of the present invention, there is provided an information processing apparatus including: receiving means for receiving a command requesting for the execution of predetermined processing; storage means for storing data and also storing first information indicating, among a plurality of stages in a lifecycle of the information processing apparatus, the current stage determined by the stored data and second information indicating an executable command in the current stage, the executable command being determined for each of the plurality of stages; and determining means for determining on the basis of the first information and the second information whether the command received by the receiving means is an executable command in the current stage.

In this specification, the term "information processing apparatus" means not only IC cards, but also other data storage/communication devices, such as for example, cellular phones or PDAs which has IC card function. These apparatuses include at least one IC chip configured to function as an IC card.

The information processing apparatus may further include control means for controlling the first information to be updated so that the current stage of the information processing apparatus is changed in accordance with the executed command.

The second information stored in the storage means may include information indicating that no command is executable when the information processing apparatus is in a specific stage, and when the information processing apparatus is in the specific stage, the determining means may determine on the basis of the first information and the second information that the received command is not executable.

According to another embodiment of the present invention, there is provided an information processing method including the steps of: controlling the receiving of a command requesting for the execution of predetermined processing; controlling the storage of first information indicating, among a plurality of predetermined stages in a lifecycle of an information processing apparatus, the current stage determined by stored data; and determining on the basis of the first information and second information indicating an executable command in the current stage, the executable command being determined for each of the plurality of predetermined stages whether the received command is an executable command in the current stage.

A program of a recording medium according to another embodiment of the present invention includes the steps of: controlling the receiving of a command requesting for the execution of predetermined processing; controlling the storage of first information indicating, among a plurality of predetermined stages in a lifecycle of an information processing apparatus, the current stage determined by stored data; and determining on the basis of the first information and second information indicating an executable command in the current stage, the executable command being determined for each of the plurality of predetermined stages whether the received command is an executable command in the current stage.

A program according to another embodiment of the present invention allows a computer to execute the steps of: controlling the receiving of a command requesting for the execution of predetermined processing; controlling the storage of first information indicating, among a plurality of predetermined stages in a lifecycle of an information processing apparatus, the current stage determined by stored data; and determining on the basis of the first information and second information indicating an executable command in the current stage, the executable command being determined for each of the plurality of predetermined stages whether the received command is an executable command in the current stage.

According to the above-described information processing apparatus and method, the recording medium, and the program, a command requesting for the execution of predetermined processing is received, and predetermined data and first information indicating, among a plurality of predetermined stages in the lifecycle of the information processing apparatus, the current stage determined by the stored data and second information indicating an executable command in the current stage, the executable command being determined for each of the plurality of predetermined stages, are stored. On the basis of the first information and the second information, it is determined whether the received command is an executable command in the current stage.

According to an embodiment of the present invention, there is provided an information processing apparatus including: receiving means for receiving a command requesting for the execution of predetermined processing; first storage means for storing first information indicating, among a plurality of predetermined stages in a lifecycle of the information processing apparatus, the current stage determined by stored data and second information indicating an executable command in the current stage, the executable command being determined for each of the plurality of predetermined stages; determining means for determining on the basis of the first information and the second information whether the command received by the receiving means is an executable command in the current stage; and second storage means for storing authentication data which is used for mutual authentication processing and is used for encrypting or decrypting predetermined data in association with each of the plurality of predetermined stages.

The second storage means may further store data for generating the authentication data, and the information processing apparatus may further include generation means for generating, on the basis of the data for generating the authentication data, different authentication data for each of the plurality of predetermined stages.

According to the above-described information processing apparatus, a command requesting for the execution of predetermined processing is received, and predetermined data and first information indicating, among a plurality of predetermined stages in the lifecycle of the information processing apparatus, the current stage determined by the stored data and second information indicating an executable command in the current stage, the executable command being determined for each of the plurality of predetermined stages, are stored. On the basis of the first information and the second information, it is determined whether the received command is an executable command in the current stage. Authentication data used for mutual authentication processing and for encrypting or decrypting predetermined data in association with each of the plurality of predetermined stages is stored.

In this specification, the term "communication" means, not only wireless communication or wired communication, but also communication including both the wireless communication and wired communication, i.e., communication performing wireless communication in one zone and wired communication in another zone. Furthermore, wired communication may be performed from a first apparatus to a second apparatus, and wireless communication may be performed from the second apparatus to the first apparatus.

According to an embodiment of the present invention, the tampering or leakage of data or information can be prevented.

Additional features and advantages are described herein, and will be apparent from, the following Detailed Description and the figures.

BRIEF DESCRIPTION OF THE FIGURES

FIG. 8 illustrates a lifecycle stage table.

FIG. 9 illustrates a command table.

FIG. 17 is a flowchart illustrating the command execution processing in the secondary card-issued stage.

DETAILED DESCRIPTION

The present invention relates to information processing apparatuses and methods, recording media, and programs, and more particularly, to an information processing apparatus and method, a recording medium, and a program in which the tampering and leakage of data and information can be prevented.

The information processing apparatus according to an embodiment of the present invention includes: receiving means (for example, an antenna 101 shown in FIG. 5) for receiving a command requesting for the execution of predetermined processing; storage means (for example, a table storage unit 108 shown in FIG. 5) for storing predetermined data and also storing first information (for example, a lifecycle stage table shown in FIG. 8) indicating, among a plurality of predetermined stages in a lifecycle of the information processing apparatus, the current stage determined by the stored data and second information (for example, a command table shown in FIG. 9) indicating an executable command in the current stage, the executable command being determined for each of the plurality of predetermined stages; and determining means (a determining unit 131 shown in FIG. 5) for determining on the basis of the first information and the second information whether the command received by the receiving means is an executable command in the current stage.

The information processing apparatus may further include control means (for example, a controller 104 shown in FIG. 5) for controlling the first information (for example, the lifecycle stage table shown in FIG. 8) to be updated so that the current stage of the information processing apparatus is changed in accordance with the executed command.

The second information (for example, the command table shown in FIG. 9) stored in the storage means (for example, the table storage unit 108 shown in FIG. 5) may include information indicating that no command is executable when the information processing apparatus is in a specific stage (for example, a disposal stage, which is discussed below with reference to the lifecycle stage table shown in FIG. 8), and when the information processing apparatus is in the specific stage, the determining means (for example, the determining unit 131 shown in FIG. 5) may determine on the basis of the first information and the second information that the received command is not executable.

Figure 10:
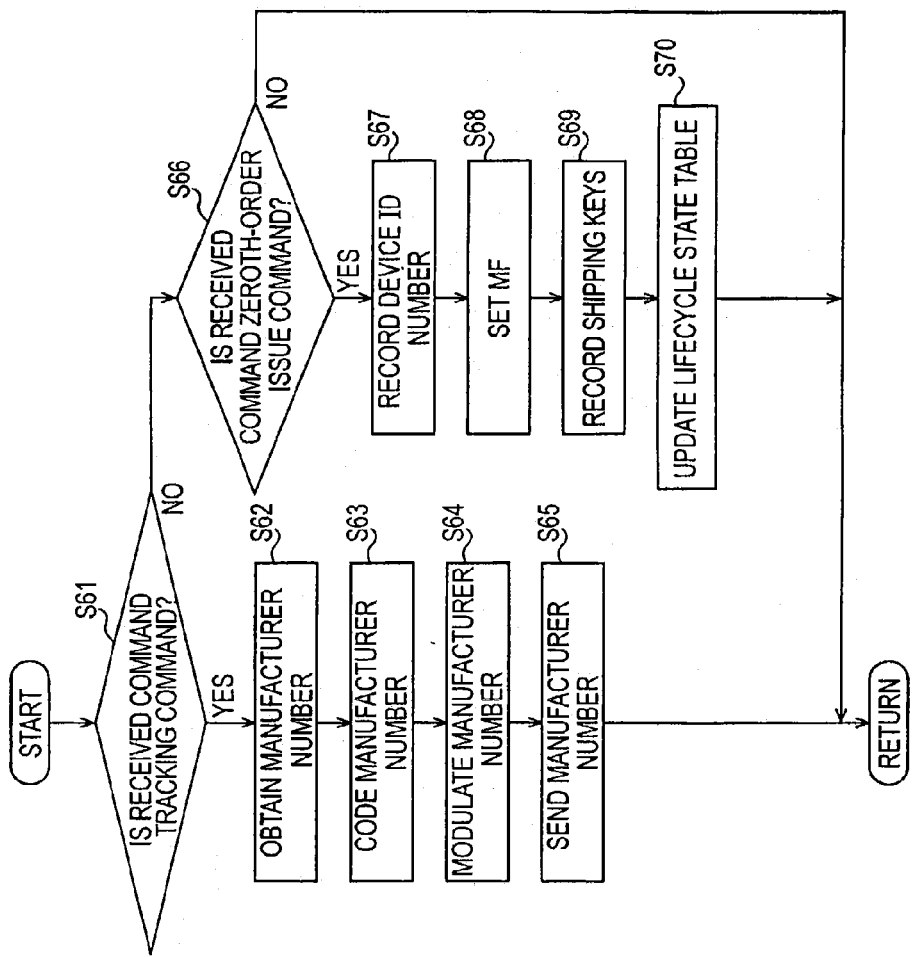
FIG. 10 is a flowchart illustrating the command execution processing in a manufacturer shipment stage.

The information processing method according to another embodiment of the present invention includes the steps of: controlling the receiving of a command requesting for the execution of predetermined processing (for example, step S32 in FIG. 7); controlling the storage of first information (for example, the lifecycle stage table shown in FIG. 8) indicating, among a plurality of predetermined stages in a lifecycle of an information processing apparatus, the current stage determined by stored data (for example, step S70 in FIG. 10); and determining on the basis of the first information and second information (for example, the command table shown in FIG. 9) indicating an executable command in the current stage, the executable command being determined for each of the plurality of predetermined stages whether the received command is an executable command in the current stage (for example, steps S61 and S66 in FIG. 10).

The processing of the recording medium according to an embodiment of the present invention and the processing of the program according to an embodiment of the present invention are basically similar to that of the above-described information processing apparatus, and an explanation thereof is thus omitted.

The information processing apparatus according to another embodiment of the present invention includes: receiving means (for example, the antenna 101 shown in FIG. 5) for receiving a command requesting for the execution of predetermined processing; first storage means (for example, the table storage unit 108 shown in FIG. 5) for storing first information (for example, the lifecycle stage table shown in FIG. 8) indicating, among a plurality of predetermined stages in a lifecycle of the information processing apparatus, the current stage determined by stored data and second information (for example, the command table shown in FIG. 9) indicating an executable command in the current stage, the executable command being determined for each of the plurality of predetermined stages; determining means (for example, the determining unit 131 shown in FIG. 5) for determining on the basis of the first information and the second information whether the command received by the receiving means is an executable command in the current stage; and second storage means (for example, a memory 107 shown in FIG. 5) for storing authentication data (for example, shipping keys A and B shown in FIG. 12) which is used for mutual authentication processing and is used for encrypting or decrypting predetermined data in association with each of the plurality of predetermined stages.

The second storage (for example, the memory 107 shown in FIG. 5) means may further store data (for example, service provider keys A and B shown in FIG. 14) for generating the authentication data, and the information processing apparatus may further include generation means (for example, a controller 104 shown in FIG. 5) for generating, on the basis of the data for generating the authentication data, different authentication data for each of the plurality of predetermined stages.

An embodiment of the present invention can be used in an information processing system for sending and receiving data, or an e-cash system or a security system using an IC card via a wired or wireless communication network.

The present invention is described in detail below with reference to the accompanying drawings through illustration of a preferred embodiment.

Figure 1:
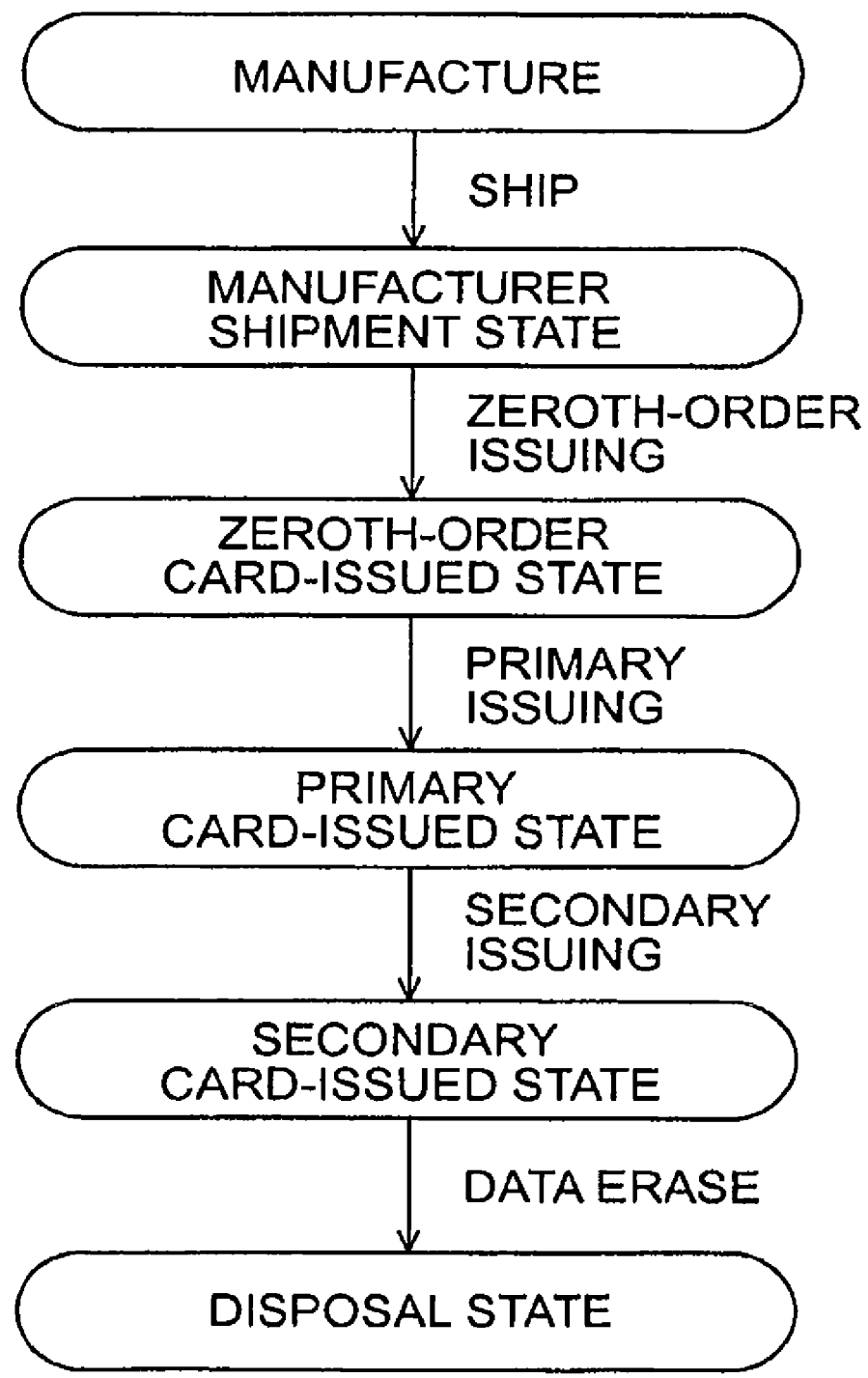
FIG. 1 illustrates the lifecycle of a known IC card.
Figure 2:
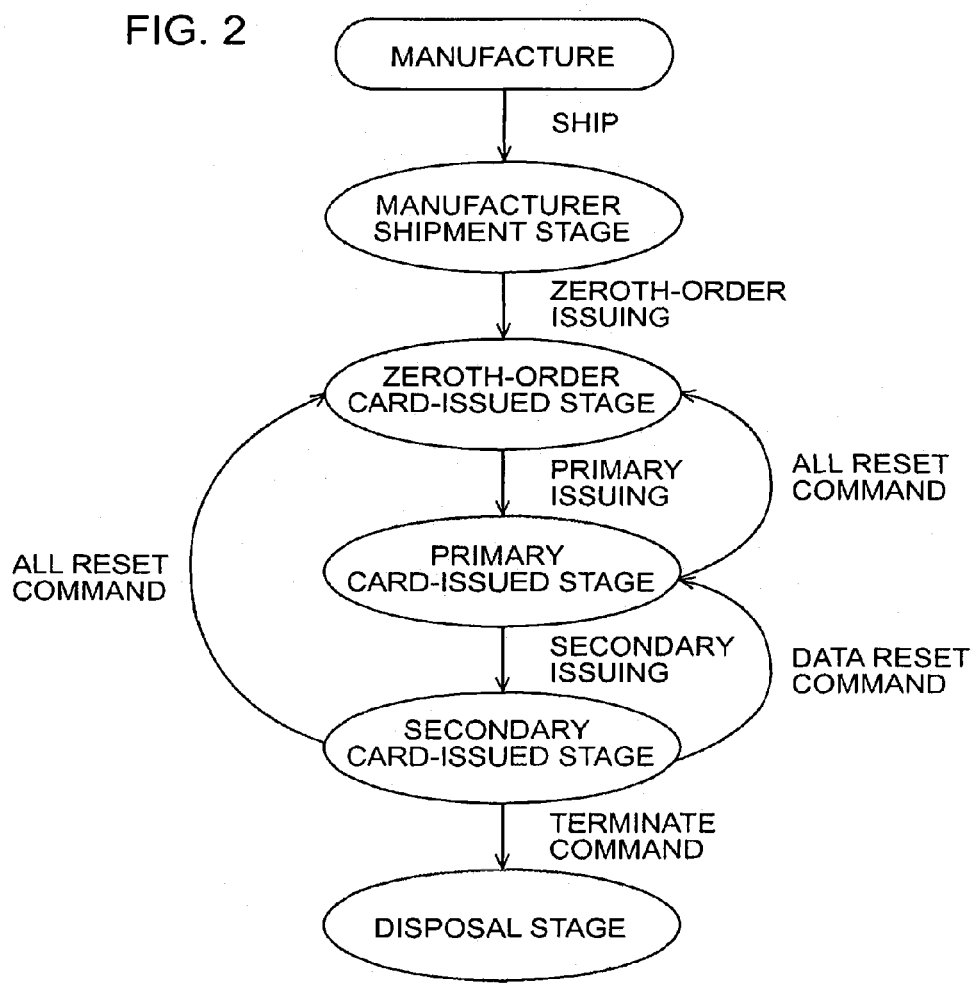
FIG. 2 illustrates the lifecycle of an IC card according to an embodiment of the present invention.

FIG. 2 illustrates the lifecycle of an IC card according to an embodiment of the present invention.

The IC card is manufactured by a predetermined card manufacturer and is shipped to an IC-card issuer as the IC card without data for providing services or a key for accessing data (hereinafter such a card stage is referred to as the "manufacturer shipment stage"). On the IC card in the manufacturer shipment stage, the manufacturer number, which serves as information for specifying the card manufacturer manufactured the IC card, is recorded.

Each stage in the lifecycle of the IC card is determined by the data recorded in the IC card, and the stage of the IC card is changed by the execution of a predetermined command, such as a command for issuing the IC card.

The IC-card issuer sends a zeroth-order issue command to the IC card in the manufacturer shipment stage by operating an IC-card issue machine (reader/writer) and allows the IC card to execute predetermined processing to perform the zeroth-order issue operation.

The IC card in the manufacturer shipment stage receives the zeroth-order issue command from the reader/writer and executes it. In this case, the IC card records data contained in the zeroth-order issue command, for example, the device identification (ID) number, which serves as information for specifying the IC card, the main folder (MF) for storing data required for providing services, and the shipping key, which serves as the authentication key used for conducting mutual authentication with the service provider.

The IC-card issuer ships the IC card subjected to the zeroth-order issue operation (hereinafter such a card stage is referred to as the "zeroth-order card-issued stage") to a service provider providing predetermined services to the user by using the IC card.

The service provider sends a primary issue command to the IC card in the zeroth-order card-issued stage by operating the reader/writer, and allows the IC card to execute predetermined processing to perform the primary issue operation.

The IC card then receives the primary issue command from the reader/writer and executes it. In this case, the IC card records, for example, a folder/directory (DF) and an elementary file (EF) for storing data required for using services and an authentication key required for accessing the DF or EF, as MF-dependent data, based on the primary issue command.

In the DF, the EF corresponding to the file is stored. The DF and EF are defined in International Organization for Standardization (ISO) 7816.

The service provider distributes the IC card subjected to the primary issue operation (hereinafter such a card stage is referred to as the "primary card-issued stage") to a facility providing services to a user, such as to an office of the service provider.

In the office receiving the IC card, the service provider sends a secondary issue command or an all reset command, indicating an instruction to erase (delete) data recorded on the IC card to reset the IC card to the zeroth-order card-issued stage, to the IC card in the primary card-issued stage by operating the reader/writer, and allows the IC card to perform predetermined processing.

Upon receiving, for example, the all reset command from the reader/writer, the IC card erases the DF, EF, and the authentication key for accessing the DF or the EF. After executing the all reset command, the lifecycle stage of the IC card is reset to the zeroth-order card-issued stage.

Upon receiving, for example, the secondary issue command from the reader/writer, the IC card records data, such as personal information required for the user to receive services and the authentication key required for accessing the data, as DF-dependent data based on the secondary issue command.

In other words, the IC card stores in the EF the data, such as personal information required for the user to receive services, and the authentication key required for accessing the data as the DF-dependent data based on the secondary issue command.

In the office, the service provider sends the IC card in the secondary card issued stage the all reset command for erasing the data recorded on the IC card to reset the IC card to the zeroth-order card-issued stage or a data reset command for erasing the personal information recorded on the IC card to reset the IC card to the primary card-issued stage by operating the reader/writer, and allows the IC card to perform predetermined processing.

Upon receiving, for example, the all reset command from the reader/writer, the IC card erases the DF and EF, and the authentication key required for accessing the EF or EF. The lifecycle stage of the IC card executed the all reset command is reset to the zeroth-order card issue stage.

Upon receiving, for example, the data reset command from the reader/writer, the IC card erases data, such as personal information required for the user to receive services and the authentication key required for accessing the data. The lifecycle stage of the IC card executed the data reset command is reset to the primary card-issued stage.

The IC card subjected to the secondary issue operation (secondary card-issued stage) is distributed to the user in the corresponding office. The user then uses the IC card recording the user personal information thereon as, for example, an e-commuting ticket or an e-wallet, to receive the services provided by the service provider.

When the IC card is disused, it is recollected by the service provider. The service provider sends a terminate command for erasing data stored in the recollected IC card and for resetting the IC card to a disposal stage in which no command can be executed by operating the reader/writer, and allows the IC card to perform predetermined processing.

Upon receiving the terminate command from the reader/writer, the IC card erases the recorded data. The lifecycle stage of the IC card executed the terminate command is set to the disposal stage, and the IC card in the disposal stage does not execute any command.

Then, the service provider recollects the IC card from the user and delivers it to a disposal agent, and the disposal agent physically disposes of the IC card.

In this manner, in each stage of the lifecycle of the IC card, the issue operation of the IC card is performed. The IC card stores information indicating the lifecycle stage of the IC card and the commands that can be executed in each stage, and even if the execution of a command that should not be executed is instructed, the IC card does not execute that command.

In each stage of the lifecycle, the IC card receives various commands from the reader/writer and executes them.

Figure 3:
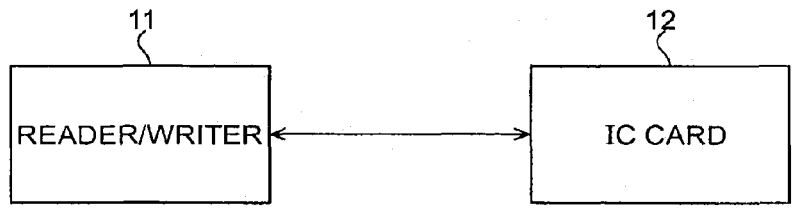
FIG. 3 is a block diagram illustrating a wireless communication system according to an embodiment of the present invention.

FIG. 3 illustrates a wireless communication system including a reader/writer 11 and an IC card 12. The reader/writer 11 and the IC card 12 perform non-contact wireless communication to send and receive data therebetween by using electromagnetic waves.

The reader/writer 11 radiates radio waves (electromagnetic waves) to detect the IC card 12 by performing, for example, polling.

When the IC card 12 is detected by the reader/writer 11 by being brought into close contact with the reader/writer 11, the reader/writer 11 and the IC card 12 conduct mutual authentication by sending and receiving predetermined data if necessary.

After establishing mutual authentication, the reader/writer 11 generates a command instructing the IC card 12 to perform predetermined processing, such as IC-card issuing, and sends the generated command to the IC card 12 by wireless communication.

Upon receiving the command from the reader/writer 11, the IC card 12 determines whether the received command is a command that can be executed in the current lifecycle stage of the IC card 12 on the basis of the information indicating the lifecycle stage of the IC card 12 and commands that can be executed in each stage of the IC card 12.

If it is determined that the received command is a command that can be executed in the lifecycle stage of the IC card 12, the IC card 12 executes the received command. In contrast, if it is determined that the received command is not a command that can be executed in the lifecycle stage of the IC card 12, the IC card 12 does not execute the received command.

It is now assumed, for example, that the lifecycle stage of the IC card 12 is the manufacturer shipment stage in which only the zeroth-order issue command can be executed. In this case, in response to a primary issue command, the IC card 12 determines that the received command is not a command that can be executed in the lifecycle stage of the IC card 12 and does not execute the received command.

If the lifecycle stage of the IC card 12 is the disposal stage, the IC card 12 neither conducts mutual authentication nor executes a received command.

Figure 4:
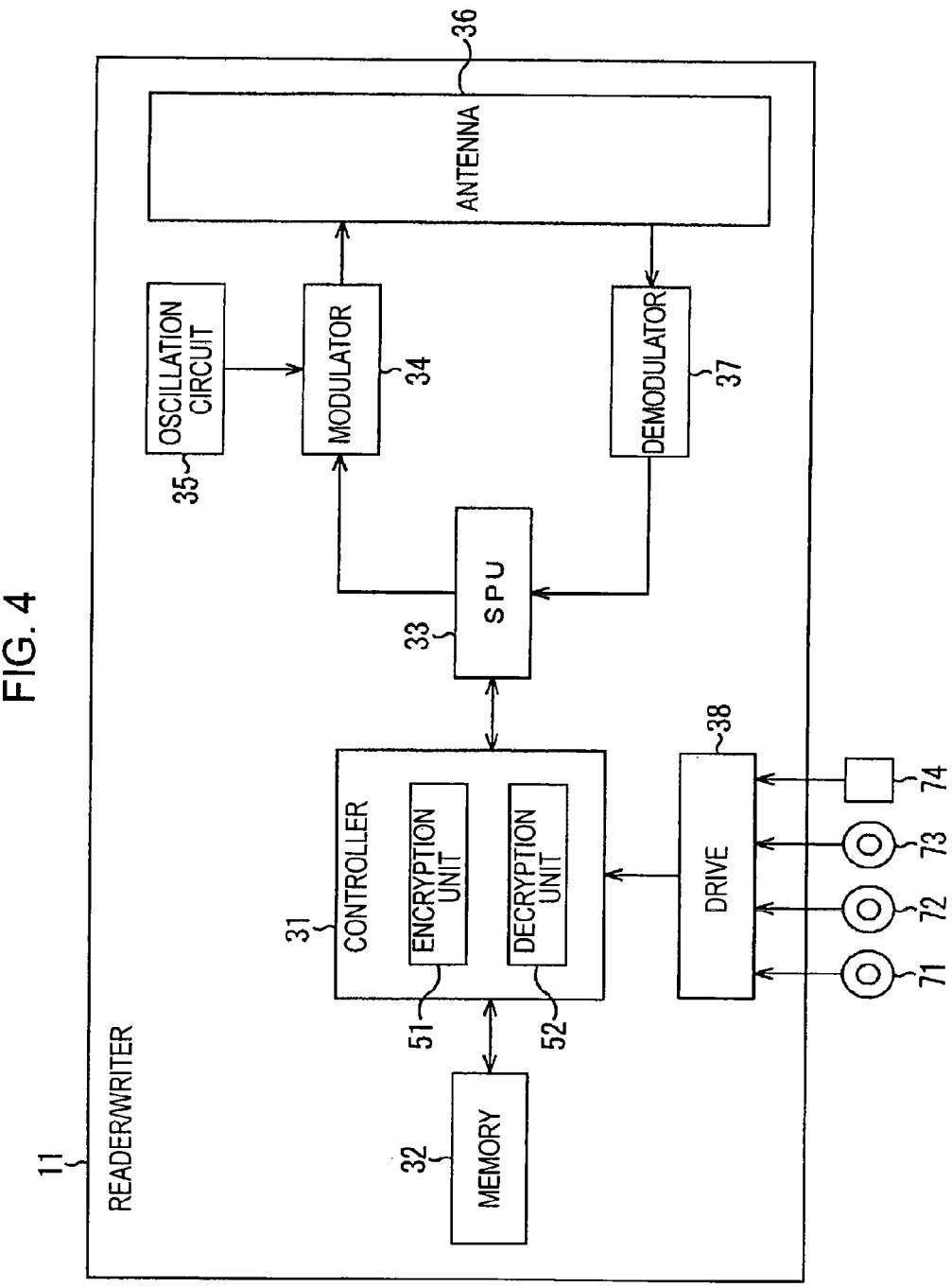
FIG. 4 is a block diagram illustrating the functional configuration of a reader/writer.

FIG. 4 is a block diagram illustrating the functional configuration of the reader/writer 11.

The reader/writer 11 includes a controller 31, a memory 32, a signal processing unit (SPU) 33, a modulator 34, an oscillation circuit 35, an antenna 36, a demodulator 37, and a drive 38.

The controller 31 generates various commands instructing the IC card 12 to execute predetermined processing, and supplies the generated commands to the SPU 33. The controller 31 generates, for example, a zeroth-order issue command, an all reset command, a terminate command, and a command for conducting mutual authentication (hereinafter also referred to as a "mutual authentication command"), and supplies the generated commands to the SPU 33.

The controller 31 includes an encryption unit 51 and a decryption unit 52. If necessary, the controller 31 generates data to be stored in various commands. The encryption unit 51 encrypts data generated by the controller 31 and to be stored in the commands by using, if necessary, an authentication key recorded in the memory 32. The encryption unit 51 encrypts, for example, data generated by the controller 31 and to be stored in a mutual authentication command, by using the corresponding authentication key recorded in the memory 32.

The decryption unit 52 decrypts data supplied from the SPU 33 by using, if necessary, an authentication key recorded in the memory 32. That is, if the data supplied from the SPU 33 is encrypted by a predetermined method, the decryption unit 52 decrypts the data supplied from the SPU 33 with an authentication key recorded in the memory 32 by using a decryption method associated with the encryption method. The controller 31 then supplies the data decrypted by the decryption unit 52 to the memory 32 if necessary.

If the data supplied from the SPU 33 is not encrypted, the decryption unit 52 does not decrypt the data.

The controller 31 reads a program supplied from the drive 38, which is attached to the reader/writer 11, and executes the read program. If a program or data is supplied from the drive 38, the controller 31 supplies the program or data to the memory 32 if necessary and reads the program recorded in the memory 32 to execute the read program.

The memory 32 is a so-called "non-volatile rewritable storage medium or recording medium", for example, a hard disk or a flash memory, that can retain data even if power supply is cut off. The memory 32 records various data and supplies the recorded data to the controller 31.

The memory 32 also records authentication keys related to the data recorded on the IC card 12 and supplies the recorded authentication keys to the controller 31. The memory 32 also records data supplied from the controller 31.

The SPU 33 codes a command supplied from the controller 31 according to a predetermined method and supplies the coded command to the modulator 34. The SPU 33 also decodes data supplied from the demodulator 37 according to a decoding method corresponding to the method for coding the data and supplies the decoded data to the controller 31.

If, for example, a command to be sent to the IC card 12 is supplied from the controller 31, the SPU 33 performs a coding operation, such as the Manchester coding, on the command, and outputs the resulting signal to the modulator 34. If, for example, data from the IC card 12 is supplied from the demodulator 37, the SPU 33 performs a decoding operation, such as the Manchester decoding, on the data, and supplies the resulting signal to the controller 31.

The modulator 34 generates a carrier wave on the basis of a clock signal having a predetermined frequency supplied from the oscillation circuit 35. The modulator 34 modulates a command supplied from the SPU 33 according to a predetermined method on the basis of the carrier wave, and supplies the modulated command to the antenna 36. The modulator 34 modulates the command from the SPU 33 by, for example, changing the phase, the amplitude, or the frequency of the carrier wave.

More specifically, the modulator 34 performs amplitude shift keying (ASK) modulation on the data supplied from the SPU 33 by using a clock signal having a frequency of 13.56 MHz supplied from the oscillation circuit 35 as the carrier wave, and outputs the modulated waves through the antenna 36 as electromagnetic waves.

The oscillation circuit 35 generates a reference clock signal having a predetermined frequency and supplies the generated clock signal to the modulator 34.

The antenna 36 sends the command supplied from the modulator 34 to the IC card 12 by wireless communication. That is, the antenna 36 radiates radio waves for transmitting the command supplied from the modulator 34. The antenna 36 also receives data from the IC card 12 and supplies the received data to the demodulator 37.

The demodulator 37 demodulates the data supplied from the antenna 36 according to a demodulation method associated with the modulation method of a demodulator 110 of the IC card 12 (FIG. 5) and supplies the demodulated data to the SPU 33. The demodulator 37 demodulates, for example, the modulated wave (ASK modulated wave), supplied via the antenna 36 and outputs the demodulated data to the SPU 33.

When a magnetic disk 71, an optical disc 72, a magneto-optical disk 73, or a semiconductor memory 74 is installed in the drive 38, the drive 38 drives the installed recording medium and obtains a program or data recorded on the recording medium. The obtained program or data is transferred to the controller 31 or the IC card 12. The program transferred (sent) to the IC card 12 is recorded or executed if necessary.

Figure 5:
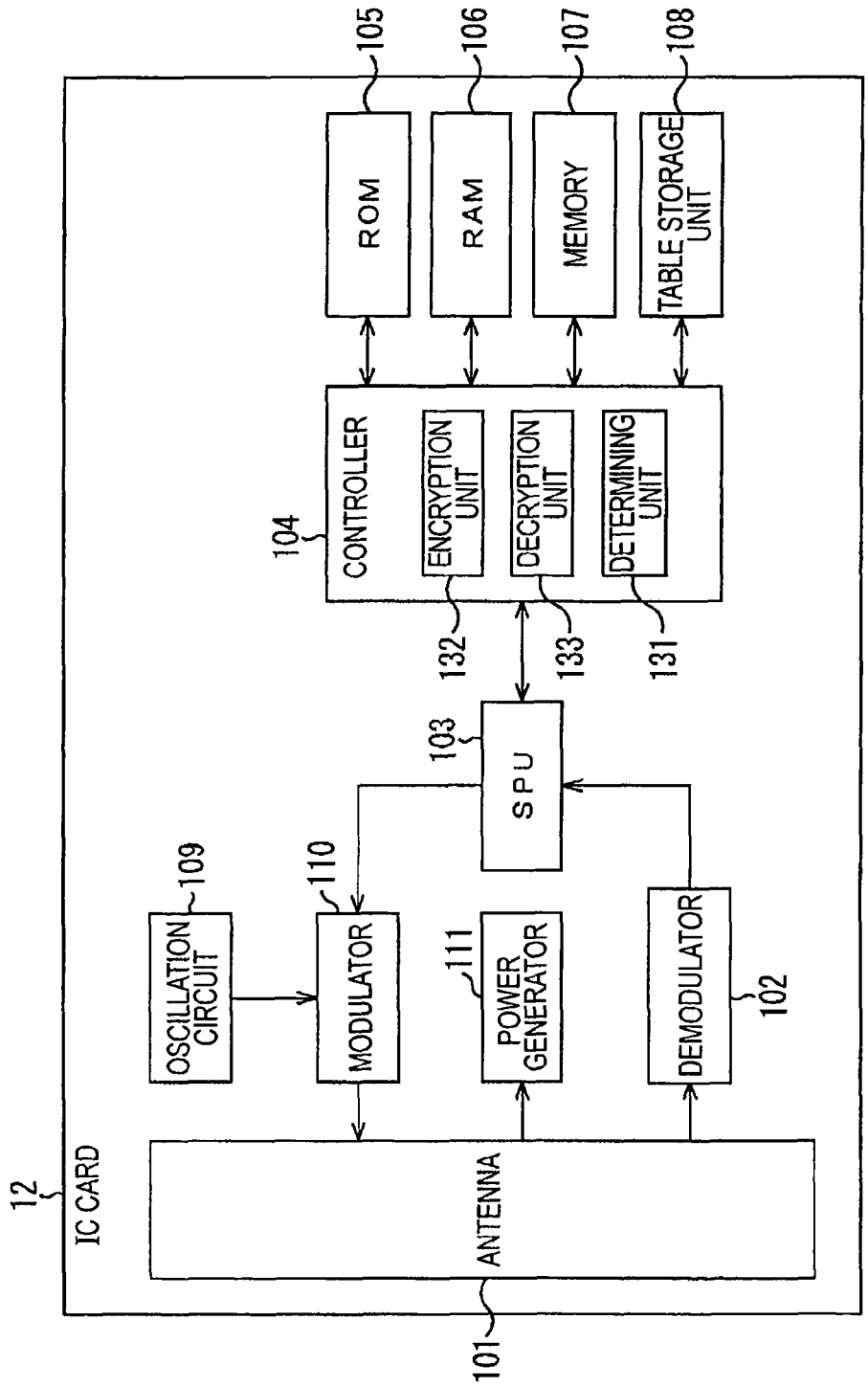
FIG. 5 is a block diagram illustrating the functional configuration of an IC card.

FIG. 5 is a block diagram illustrating the functional configuration of the IC card 12.

The IC card 12 includes an antenna 101, a demodulator 102, an SPU 103, a controller 104, a read only memory (ROM) 105, a random access memory (RAM) 106, a memory 107, a table storage unit 108, an oscillation circuit 109, the modulator 110, and a power generator 111.

The antenna 101 receives a command sent from the reader/writer 11 and supplies the received command to the demodulator 102. The antenna 101 also sends data supplied from the modulator 110 to the reader/writer 11 by wireless communication. That is, the antenna 110 radiates radio waves for transmitting data supplied from the modulator 110. In the antenna 110, resonance occurs by the radio waves having a predetermined frequency radiated from the reader/writer 11 to generate an electromotive force.

The demodulator 102 demodulates a command supplied from the antenna 101 according to a demodulation method associated with the modulation method of the modulator 34 of the reader/writer 11 (FIG. 4), and supplies the demodulated command to the SPU 103. For example, the demodulator 102 demodulates a command represented by ASK modulated waves received via the antenna 101 by performing envelope detection, and outputs the demodulated command to the SPU 103.

The SPU 103 decodes the command supplied from the demodulator 102 according to a predetermined method and supplies the decoded command to the controller 104. If, for example, the command demodulated by the demodulator 102 is coded by the Manchester coding method, the SPU 103 decodes the Manchester coded command on the basis of a clock signal supplied from a phase locked loop (PLL) (not shown), and supplies the decoded command to the controller 104. The SPU 103 also codes data supplied from the controller 104 according to a predetermined coding method and supplies the coded data to the modulator 110. For example, the SPU 103 codes the data supplied form the controller 104 by the Manchester coding method and supplies the coded data to the modulator 110.

The controller 104 executes various commands supplied from the SPU 103. The controller 104 includes a determining unit 131, an encryption unit 132, and a decryption unit 133.

The determining unit 131 determines on the basis of a lifecycle stage table and a command table stored in the table storage unit 108 whether a command supplied from the SPU 103 is a command that can be executed in the lifecycle stage of the IC card 12.

The lifecycle stage table indicates the lifecycle stages of the IC card 12. The command table indicates commands that can be executed by the IC card 12 in each lifecycle stage of the IC card 12. Details of the lifecycle stage table and the command table are given below.

If the command supplied from the SPU 103 is found to be a command that can be executed in the current lifecycle stage of the IC card 12, the controller 104 executes the command from the SPU 103. In contrast, if it is determined that the command supplied form the CPU 103 is not a command that can be executed in the current lifecycle stage of the IC card 12, the controller 104 does not execute that command.

For example, in response to a mutual authentication command from the SPU 103, the controller 104 executes that command. In this case, the encryption unit 132 encrypts data, such as random numbers or a time stamp, required for conducting mutual authentication by using an authentication key recorded in the memory 107. The controller 104 then supplies the data encrypted by the encryption unit 132 to the SPU 103.

The controller 104 also controls the memory 107 in accordance with a command supplied from the SPU 103 to erase or update (overwrite) the data recorded in the memory 107.

If the data contained in a command supplied from the SPU 103 is encrypted by a predetermined encryption method, the decryption unit 133 decrypts the data by using an authentication key recorded in the memory 107 by a decryption method associated with the encryption method. The controller 104 then supplies the data decrypted by the decryption unit 133 to the memory 107 if necessary. If the data contained in a command supplied from the SPU 103 is not encrypted, the decryption unit 133 does not decrypt the data.

The controller 104 controls the table storage unit 108 to update the lifecycle stage table stored in the table storage unit 108. If, for example, the controller 104 performs the zeroth-order issue operation by executing the zeroth-order issue command, it controls the table storage unit 108 to update the lifecycle stage table to indicate that the current lifecycle stage is the zeroth-order card-issued stage.

The controller 104 reads a program recorded in the ROM 105 if necessary, and executes the read program. The controller 104 supplies data to the RAM 106 if necessary, and also obtains data temporarily stored in the RAM 106.

The ROM 105 records programs and data needed for the controller 104 to execute various items of processing. The ROM 105 supplies the recorded programs and data to the controller 104.

The RAM 106 temporarily stores data that is being used when the processing is in progress by the controller 104, and also supplies data stored in the RAM 106 to the controller 104.

The memory 107 is a non-volatile memory, such as a flash memory, an electrically erasable programmable read only memory (EEPROM), a magnetoresistive random access memory (MRAM), or a ferroelectric random access memory (FeRAM), and records various types of data, such as sensitive data, to be sent to the reader/writer 11. The memory 107 also records authentication keys used for conducting mutual authentication with the reader/writer 11.

The table storage unit 108 is a non-volatile memory, for example, a flash memory, an EEPROM, an MRAM, or a FeRAM, and stores the lifecycle stage table and the command table. The table storage unit 108 updates the lifecycle stage table under the control of the controller 104.

The oscillation circuit 109 generates a clock signal having the same frequency as that of a command received by the antenna 101, and supplies the generated clock signal to the modulator 110. The oscillation circuit 109 has, for example, a built-in PLL circuit, to generate a clock signal having the same frequency as that of the command.

The modulator 110 generates a carrier wave on the basis of the clock signal having a predetermined frequency supplied from the oscillation circuit 109. The modulator 110 then modulates data supplied from the SPU 103 according to a predetermined method on the basis of the carrier wave, and supplies the modulated data to the antenna 101. The modulator 110 performs, for example, ASK modulation, on the data coded by the Manchester coding method supplied from the SPU 103, and sends the modulated data to the reader/writer 11 via the antenna 101.

The modulator 110 may turn ON or OFF a predetermined switching device (not shown) for the data supplied from the SPU 103, and connects a predetermined load in parallel with the antenna 101 only when the switching device is ON to change the load of the antenna 101. The ASK-modulated data is then sent to the reader/writer 11 via the antenna 101 by a change in the load of the antenna 101. More specifically, the ASK-modulated data changes the terminal voltage of the antenna 36 of the reader/writer 11.

The power generator 111 generates DC power on the basis of the AC electromotive force generated in the antenna 101 and supplies the generated DC power to the individual elements of the IC card 12.

Figure 6:
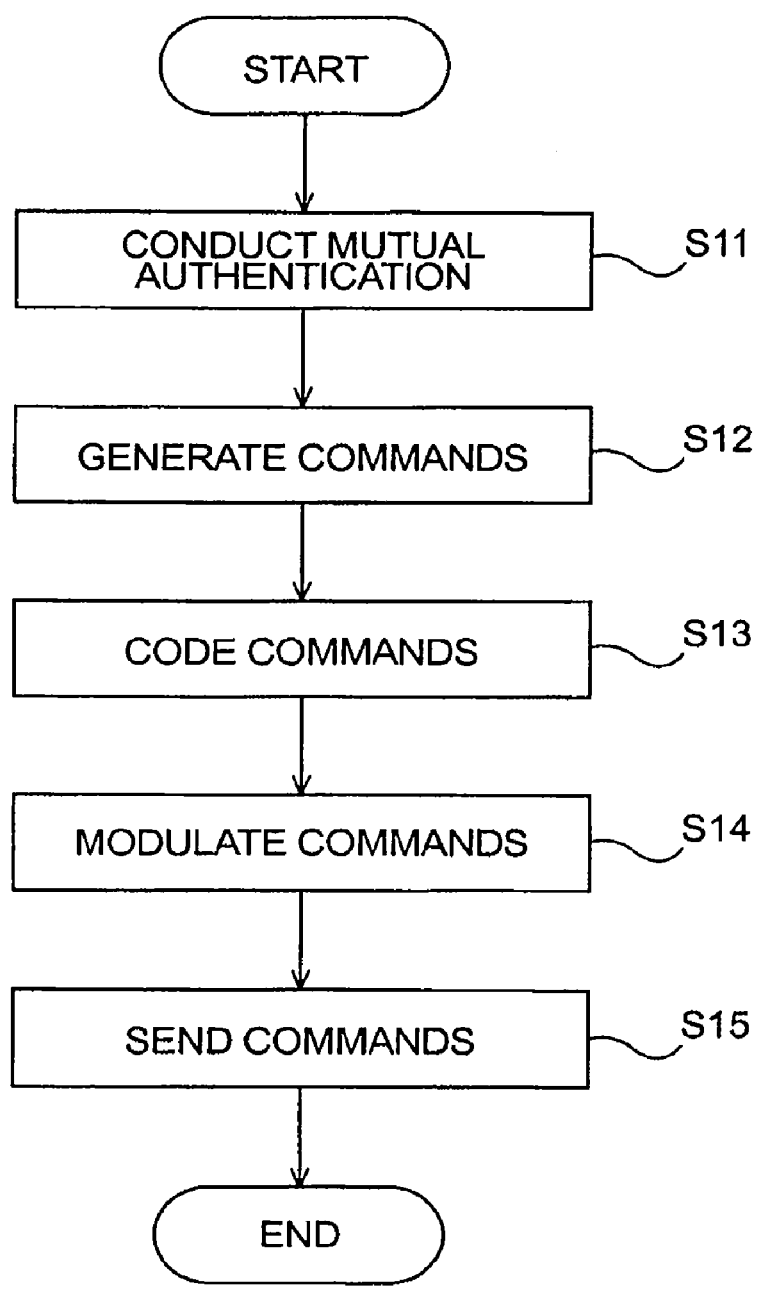
FIG. 6 is a flowchart illustrating command sending processing.

A description is now given, with reference to the flowchart of FIG. 6, of command sending processing by the reader/writer 11.

In step S11, the reader/writer 11 sends and receives data, such as random numbers, if necessary, to conduct mutual authentication with the IC card 12. The reader/writer 11 conducts mutual authentication by using, for example, symmetric encryption algorithms defined in International Organization for Standardization/International Electrotechnical Commission (ISO/IEC) 9798-2 and Japanese Industrial Standards (JIS) X5056-2.

In this case, the reader/writer 11 encrypts or decrypts data to be sent or received by using a predetermined authentication key which is preset for the data to be accessed or the command to be executed by the IC card 12. If the current lifecycle stage of the IC card 12 is the manufacturer shipment stage or the disposal stage, the reader/writer 11 does not conduct mutual authentication. If the IC card 12 is not authenticated as an authorized IC card as a result of the mutual authentication, the command sending processing is terminated.

After establishing mutual authentication, in step S12, the controller 31 generates various commands for executing predetermined types of processing and supplies the generated commands to the SPU 33.

More specifically, in step S12, the controller 31 generates, for example, a zeroth-order issue command, an all reset command, and a terminate command, and supplies them to the SPU 33. In the various commands generated by the controller 31, data required for executing those commands are stored if necessary.

In step S13, the SPU 33 codes the commands supplied from the controller 31 by a predetermined coding method, and supplies the coded commands to the modulator 34. More specifically, in step S13, the SPU 33 codes the commands supplied from the controller 31 by, for example, the Manchester coding method, and supplies the coded commands to the modulator 34.

In step S14, the modulator 34 modulates the commands supplied from the SPU 33 and supplies the modulated commands to the antenna 36. For example, in step S14, the modulator 34 modulates the commands supplied from the SPU 33 on the basis of a carrier wave having a predetermined frequency, for example, 13.56 MHz, corresponding to the clock signal supplied from the oscillation circuit 35, and supplies the modulated commands to the antenna 36.

More specifically, in step S14, the modulator 34 modulates the commands by, for example, the ASK method, the phase shift keying (PSK) method, or a frequency shift keying (FSK) method, and supplies the modulated commands to the antenna 36.

In step S15, the antenna 36 sends the commands supplied from the modulator 34 to the IC card 12 by wireless communication. More specifically, in step S15, the antenna 36 radiates radio waves for transmitting the command from the modulator 34. The command sending processing is then completed.

In this manner, the reader/writer 11 generates commands and sends the generated commands to the IC card 12 by wireless communication.

Command execution processing performed by the IC card 12 is now described below with reference to the flowchart of FIG. 7.

In step S31, the IC card 12 sends and receives data, such as random numbers, if necessary, to conduct mutual authentication with the reader/writer 11. More specifically, in step S31, the IC card 12 conducts mutual authentication with the reader/writer 11 by using, for example, symmetric encryption algorithms defined in ISO/IEC9798-2 and JIS X5056-2.

In this case, the IC card 12 encrypts or decrypts data to be sent or received by using a predetermined authentication key, which is preset for the data to be accessed or the command to be executed. If the current lifecycle stage of the IC card 12 is the manufacturer shipment stage or the disposal stage, the IC card 12 does not conduct mutual authentication. If the reader/writer 11 is not authenticated as an authorized reader/writer as a result of the mutual authentication, the command execution processing is terminated.

After establishing mutual authentication in step S31, in step S32, the antenna 101 receives commands sent from the reader/writer 11 and supplies the received commands to the demodulator 102.

In step S33, the demodulator 102 demodulates the commands received by the antenna 101 by using a demodulation method associated with the modulation method of the modulator 34 of the reader/writer 11 (FIG. 4), and supplies the demodulated commands to the SPU 103.

In step S34, the SPU 103 decodes the commands supplied from the demodulator 102 by using a decoding method associated with the coding method of the SPU 33 of the reader/writer 11 (FIG. 4), and supplies the decoded commands to the controller 104.

In step S35, the determining unit 131 of the controller 104 determines by referring to the lifecycle stage table stored in the table storage unit 108 whether the current lifecycle stage of the IC card 102 is the manufacturer shipment stage.

The table storage unit 108 stores a lifecycle stage table, such as that shown in FIG. 8.

The lifecycle stage table includes flags indicating the individual lifecycle stages of the IC card 12.

More specifically, the lifecycle stage table includes a flag associated with the manufacturer shipment stage, a flag associated with the zeroth-order card-issued stage, a flag associated with the primary card-issued stage, a flag associated with the secondary card-issued stage, and a flag associated with the disposal stage.

The flag set to be, for example, 1, indicates that the current lifecycle stage of the IC card 12 is the stage associated with that flag. The flag reset to be, for example, 0, indicates that the current lifecycle stage of the IC card 12 is not the stage associated with that flag.

In the lifecycle stage table, only one flag is set, and the other four flags are reset.

In the lifecycle stage table shown in FIG. 8, the flag associated with the manufacturer shipment stage is set to be 1, and the other flags associated with the zeroth-order card-issued stage, the primary card-issued stage, the secondary card-issued stage, and the disposal stage are reset to be 0. Accordingly, the lifecycle stage table shown in FIG. 8 indicates that the current lifecycle stage of the IC card 12 is the manufacturer shipment stage.

Figure 7:
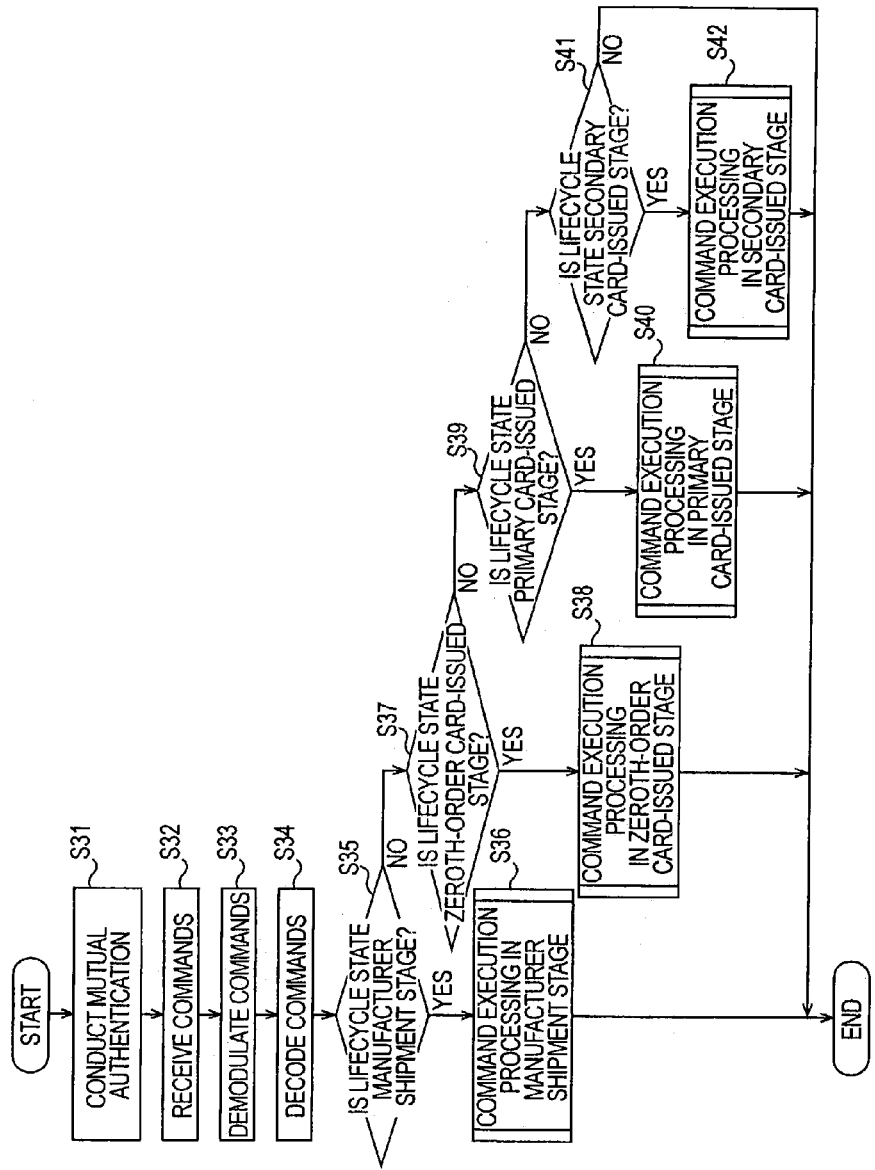
FIG. 7 is a flowchart illustrating command execution processing.

Referring back to the description of the flowchart of FIG. 7, in step S35, the determining unit 131 of the controller 104 determines by referring to the lifecycle stage table shown in FIG. 8 whether the current lifecycle stage of the IC card 12 is the manufacturer shipment stage.

In this case, since the flag corresponding to the manufacturer shipment stage is set to be 1 in the lifecycle stage table shown in FIG. 8, the determining unit 131 determines that the current lifecycle stage of the IC card 12 is the manufacturer shipment stage.

The process then proceeds to step S36 in which the IC card 12 performs command execution processing in the manufacturer shipment stage.

Although details are given below, in the command execution processing in the manufacturer shipment stage in step S36, among the commands supplied from the SPU 103, the IC card 12 executes only the commands that can be executed in the manufacturer shipment stage by referring to the command table stored in the table storage unit 108.

In this case, the table storage unit 108 stores a command table, such as that shown in FIG. 9. The command table indicates commands that can be executed in each lifecycle stage of the IC card 12.

More specifically, the command table indicates that the commands that can be executed in the manufacturer shipment stage are a tracking command and the zeroth-order issue command. The tracking command is a command for sending the manufacturer number, which serves as information for specifying the card manufacturer manufactured the IC card 12, recorded in the IC card 12 to the reader/writer 11 by wireless communication.

The command table also indicates that the commands which can be executed in the zeroth-order card-issued stage are the mutual authentication command, the tracking command, and the primary issue command, and that the commands which can be executed in the primary card-issued stage are the mutual authentication command, the all reset command, and the secondary issue command.

Similarly, the command table indicates that the commands which can be executed in the secondary card-issued stage are the mutual authentication command, the all reset command, the data reset command, a regular operation command, and the terminate command.

The regular operation command is a command for executing processing required for a user to receive services by a service provider. The IC card 12 executes the regular operation command to, for example, record data, such as user personal information, in the memory 107 or reading the user personal information from the memory 107 and sending it to the reader/writer 11 by wireless communication.

The command table also indicates that there is no command that can be executed in the disposal stage. That is, when the current lifecycle stage of the IC card 12 is the disposal stage, the IC card 12 does not execute any command.

Accordingly, in step S36, the IC card 12 executes only the tracking command or the zeroth-order issue command among the commands supplied from the SPU 103.

If it is determined in step S35 that the current lifecycle stage is not the manufacturer shipment stage, the process proceeds to step S37. In step S37, the determining unit 131 of the controller 104 determines whether the lifecycle stage is the zeroth-order card-issued stage by referring to the lifecycle stage table stored in the table storage unit 108, such as that shown in FIG. 8.

If the flag corresponding to the zeroth-order card-issued stage is set to be 1, the determining unit 131 determines that the lifecycle stage is the zeroth-order card-issued stage. If the flag corresponding to the zeroth-order card-issued stage is reset to be 0, the determining unit 131 determines that the lifecycle stage is not the zeroth-order card-issued stage.

If the lifecycle stage is found to be the zeroth-order card-issued stage in step S37, the process proceeds to step S38 in which the IC card 12 performs the command execution processing in the zeroth-order card-issued stage. The command execution processing is then completed.

Although details are given below, in the command execution processing in the zeroth-order card-issued stage, the IC card 12 executes only the commands that can be executed in the zeroth-order card-issued stage among the commands supplied from the SPU 103 by referring to the command table stored in the table storage unit 108.

Accordingly, if the table storage unit 108 stores the command table shown in FIG. 9, the IC card 12 executes only the tracking command or the primary issue command among the commands supplied from the SPU 103 in step S38.

If it is determined in step S37 that the lifecycle stage is not the zeroth-order card-issued stage, the process proceeds to step S39. In step S39, the determining unit 131 determines whether the current lifecycle stage is the primary card-issued stage by referring to the lifecycle stage table stored in the table storage unit 108, such as that shown in FIG. 8.

If the flag corresponding to the primary card-issued stage is set to be 1, the determining unit 131 determines that the lifecycle stage is the primary card-issued stage. If the flag corresponding to the primary card-issued stage is reset to be 0, the determining unit 131 determines that the lifecycle stage is not the primary card-issued stage.

If the lifecycle stage is found to be the primary card-issued stage in step S39, the process proceeds to step S40 in which the IC card 12 performs command execution processing in the primary card-issued stage. The command execution processing is then completed.

Although details are given below, in the command execution processing in the primary card-issued stage, the IC card 12 executes only the commands that can be executed in the primary card-issued stage among the commands supplied from the SPU 103 by referring to the command table stored in the table storage unit 108.

Accordingly, if the table storage unit 108 stores the command table shown in FIG. 9, the IC card 12 executes only the all reset command or the secondary issue command among the commands supplied from the SPU 103 in step S40.

If it is determined in step S39 that the lifecycle stage is not the primary card-issued stage, the process proceeds to step S41. In step S41, the determining unit 131 determines whether the lifecycle stage is the secondary card-issued stage by referring to the lifecycle stage table stored in the table storage unit 108, such as that shown in FIG. 8.

If the flag associated with the secondary card-issued stage is set to be 1, the determining unit 131 determines that the lifecycle stage is the secondary card-issued stage. If the flag associated with the secondary card-issued stage is reset to be 0, the determining unit 131 determines that the lifecycle stage is not the secondary card-issued stage.

If the lifecycle stage is found to be the secondary card-issued stage in step S41, the process proceeds to step S42 in which the IC card 12 performs the command execution in the secondary card-issued stage. The command execution processing is then completed.

Although details are given below, in the command execution processing in step S42, among the commands supplied from the SPU 103, the IC card 12 executes only the commands that can be executed in the secondary card-issued stage by referring to the command table stored in the table storage unit 108.

If the table storage unit 108 stores the command table shown in FIG. 9, in step S42, the IC card 42 executes only the all reset command, the data reset command, the regular operation command, and the terminate command among the commands supplied from the SPU 103.

If it is determined in step S41 that the lifecycle stage is not the secondary card-issued stage, it means that the lifecycle stage is the disposal stage, and the IC card 12 does not execute any command. Then, the command execution processing is terminated.

In this manner, the IC card 12 receives the commands from the reader/writer 11 and executes them.

As described above, by executing only the predetermined commands in each lifecycle stage of the IC card 12, the tampering or leakage of data or information can be prevented.

A description is now given, with reference to the flowchart of FIG. 10, of the command execution processing in the manufacturer shipment stage in step S36 in FIG. 7.

In step S61, the determining unit 131 of the controller 104 determines whether the command supplied from the SPU 103 is a tracking command. If the command is found to be a tracking command in step S61, the process proceeds to step S62 since the tracking command in the manufacturer shipment stage can be executed. In step S62, the controller 104 executes the tracking command. More specifically, in step S62, the controller 104 obtains the manufacturer number recorded in the memory 107 and supplies it to the SPU 103.

Figure 11:
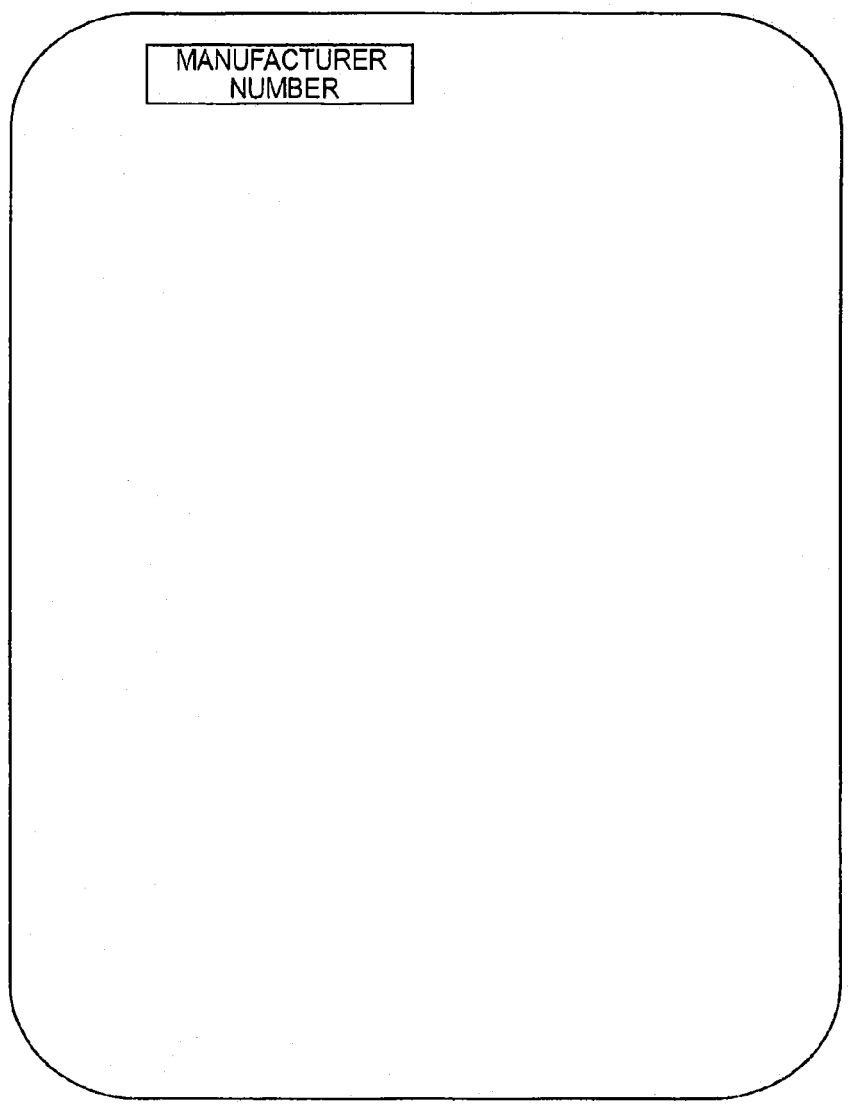
FIG. 11 illustrates the manufacturer shipment stage of an IC card.

When the current lifecycle stage of the IC card 12 is the manufacturer shipment stage, only the manufacture number, which serves as information for specifying the card manufacturer manufactured the IC card 12, is recorded, as shown in FIG. 11, in the memory 107. In addition to the manufacturer number, another information, for example, the date on which the IC card 12 was manufactured, may be recorded.

In step S63, the SPU 103 codes the manufacturer number supplied from the controller 104 according to a predetermined coding method, for example, the Manchester coding method, and supplies the coded manufacturer number to the modulator 110.

In step S64, the modulator 110 modulates the manufacturer number supplied from the SPU 103 and supplies the modulated manufacturer number to the antenna 101. More specifically, in step S64, the modulator 110 modulates the manufacturer number according to the ASK modulation method based on the carrier wave generated from the clock signal supplied from the oscillation circuit 109, and supplies the modulated manufacturer number to the antenna 101.

In step S65, the antenna 101 sends the modulated manufacturer number supplied from the modulator 110 to the reader/writer 11 by, for example, transmitting radio waves, by wireless communication. The command execution processing is then completed. Upon receiving the manufacturer number sent from the IC card 12, the reader/writer 11 can check the manufacturer source of the IC card 12.

If it is determined in step S61 that the command supplied from the SPU 103 is not a tracking command, the process proceeds to step S66 to determine whether the supplied command is a zeroth-order issue command.

If the supplied command is found to be a zeroth-order issue command in step S66, the process proceeds to step S67 since the zeroth-order issue command can be executed in the manufacturer shipment stage. In step S67, the controller 104 executes the zeroth-order issue command.

More specifically, in step S67, the controller 104 supplies the device ID number contained in the zeroth-order issue command to the memory 107, and the memory 107 records the device ID number therein.

The device ID number is the ID number unique to and specifying the IC card 12.

In step S68, the controller 104 sets an MF. More specifically, the controller 104 generates an MF and information for managing data contained in the MF, and supplies the generated MF and management information to the memory 107. The memory 107 then records the MF and the management information. The management information includes information indicating the attributes of the MF, for example, the number of DFs and EFs contained in the MF.

In step S69, the controller 104 supplies shipping keys contained in the zeroth-order issue command to the memory 107 as the authentication keys for the MF. The memory 107 records the shipping keys as the authentication keys for the MF. The shipping keys are authentication keys used for conducting mutual authentication when a service provider to perform the primary issue operation operates the reader/writer 11 to control the IC card 12 to execute a tracking command or a primary issue command.

In step S70, the table storage unit 108 updates the lifecycle stage table under the control of the controller 104 to indicate that the current lifecycle stage is the zeroth-order card-issued stage.

More specifically, in step S70, the table storage unit 108 resets the flag corresponding to the manufacturer shipment stage of the lifecycle stage table shown in FIG. 8 to be 0, and sets the flag corresponding to the zeroth-order card-issued stage to be 1, thereby updating the lifecycle stage table. The command execution processing is then completed.

Figure 12:
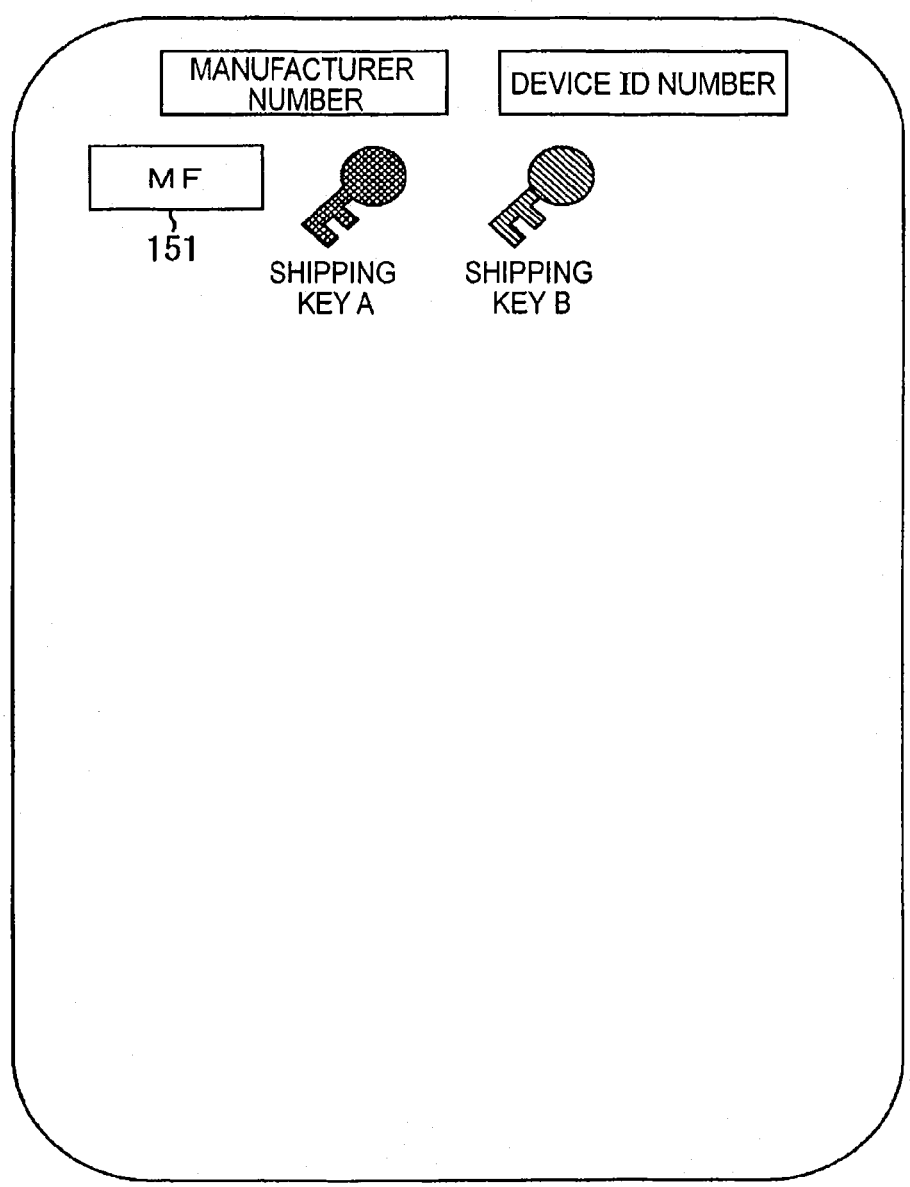
FIG. 12 illustrates the zeroth-order card-issued stage of an IC card.

When the lifecycle stage is the zeroth-order card-issued stage, the manufacturer number, for example, the device ID number, an MF 151, a shipping key A, and a shipping key B are recorded, as shown in FIG. 12, in the memory 107.

The MF 151 is the folder at the highest layer in a hierarchical structure. In addition to the MF 151, the information for managing the data contained in the MF 151 is also recorded in the memory 107.

The memory 107 also records the shipping key A and the shipping key B as authentication keys. Upon receiving a mutual authentication command for sending a tracking command or a primary issue command from the reader/writer 11, the IC card 12 in the zeroth-order card-issued stage conducts mutual authentication with the reader/writer 11 by using the shipping key A and the shipping key B.

Referring back to the description of the flowchart in FIG. 10, if it is determined in step S66 that the command supplied from the SPU 103 is not a zeroth-order issue command, the command execution processing is terminated since the supplied command cannot be executed in the manufacturer shipment stage.

For example, if the command supplied from the SPU 103 is found to be a primary issue command in step S66, the command execution processing is terminated since the primary issue command is not a command that can be executed in the manufacturer shipment stage.

In this manner, the controller 104 executes the tracking command or the zeroth-order issue command supplied from the SPU 103.

As describe above, by executing only the predetermined commands that can be executed in the manufacturer shipment stage of the IC card 12, the tampering or leakage of data or information can be prevented.

The command execution processing in the zeroth-order card-issued stage in step S38 of FIG. 7 is discussed below with reference to the flowchart of FIG. 13.

In step S101, the determining unit 131 of the controller 104 determines whether the command supplied from the SPU 103 is a tracking command. If the supplied command is found to be a tracking command in step S101, the process proceeds to step S102 since the tracking command can be executed in the zeroth-order card-issued stage, and the controller 104 executes the tracking command.

Figure 13:
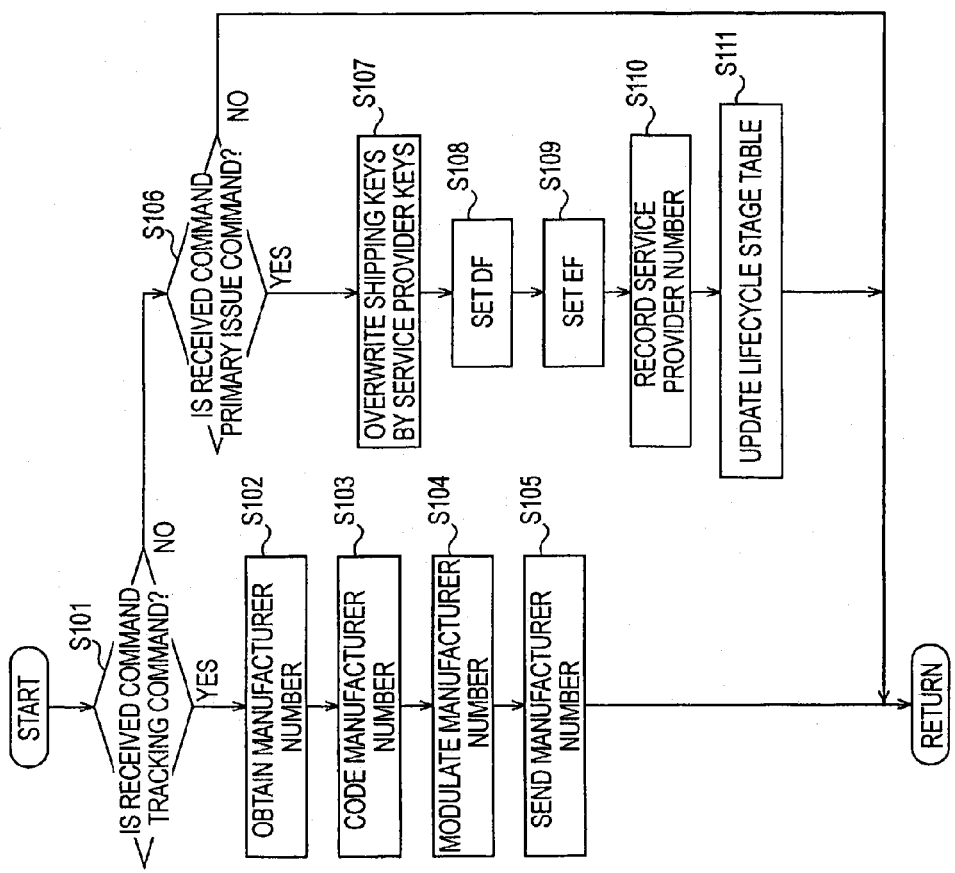
FIG. 13 is a flowchart illustrating the command execution processing in the zeroth-order card-issued stage.

Steps S102 through S105 in FIG. 13 are similar to steps S62 through S65, respectively, in FIG. 10, and an explanation thereof is thus omitted.

If it is determined in step S101 that the supplied command is not a tracking command, the process proceeds to step S106 to determine whether the supplied command is a primary issue command.

If the supplied command is found to be a primary issue command in step S106, the process proceeds to step S107 since the primary issue command can be executed in the zeroth-order card-issued stage. In step S107, the controller 104 executes the primary issue command.

More specifically, in step S107, the controller 104 supplies the service provider keys, which serve as the authentication keys, contained in the primary issue command to the memory 107. The memory 107 then overwrites the stored authentication keys by the service provider keys supplied from the controller 104. The service provider keys are authentication keys used for conducting mutual authentication when the service provider to perform the secondary issue operation operates the reader/writer 11 to control the IC card 12 to execute an all reset command, a secondary issue command, a data reset command, or a terminate command.

In step S108, the controller 104 sets a DF. More specifically, the controller 104 generates a DF dependent on the MF 151 and information for managing data contained in the DF and supplies the generated DF and management information to the memory 107. The memory 107 then records the DF and management information. The management information includes the authentication keys for the DF and information indicating the attributes of the DF, for example, the overwriting of the data contained in the DF is prohibited or the overwriting of part of the data is permitted.

In step S109, the controller 104 sets an EF. More specifically, the controller 104 generates a DF-dependent EF and information for managing data contained in the EF and supplies the generated EF and management information to the memory 107. The memory 107 then records the EF and management information. The management information includes the authentication keys for the EF and information indicating the attributes of the EF, for example, the overwriting of the data contained in the EF is prohibited or the overwriting of part of the data is permitted.

In step S110, the controller 104 supplies the service provider number contained in the primary issue command to the memory 107. The memory 107 then records the service provider number. The service provider number is information for specifying the service provider to perform the primary issue operation.

In step S111, the table storage unit 108 updates the lifecycle stage table under the control of the controller 104 to indicate that the current lifecycle stage is the primary card-issued stage.

More specifically, in step S111, under the control of the controller 104, the table storage unit 108 reset the flag corresponding to the zeroth-order card-issued stage in the lifecycle stage table to be 0, and sets the flag corresponding to the primary card-issued stage to be 1, thereby updating the lifecycle stage table. The command execution processing is then completed.

Figure 14:
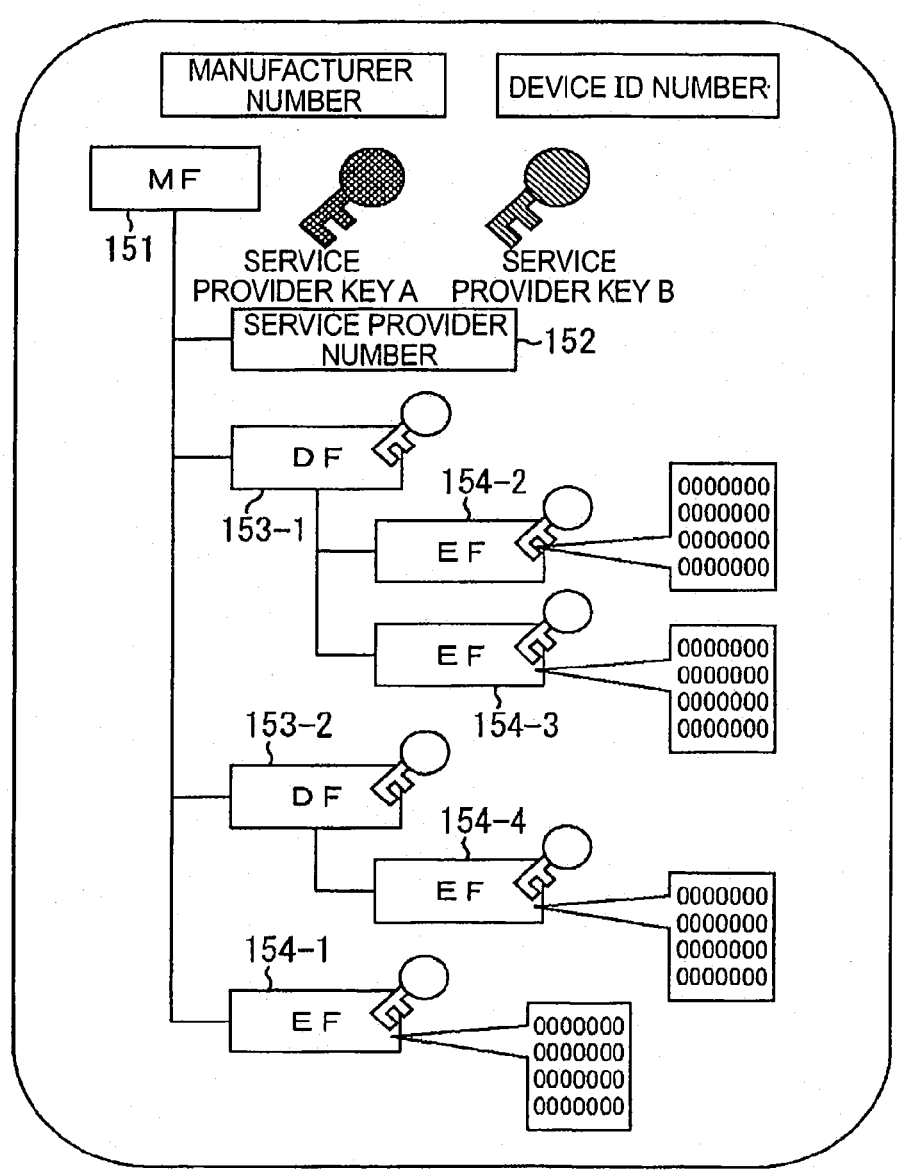
FIG. 14 illustrates the primary card-issued stage of an IC card.

When the lifecycle stage is the primary card-issued stage, for example, the manufacturer number, the device ID number, the MF 151, a service provider key A, a service provider key B, a service provider number 152, a DF 153-1, a DF 153-2, and EFs 154-1 through 154-4, are recorded, as shown in FIG. 14, in the memory 107. In FIG. 14, elements corresponding to those in FIG. 12 are designated with like reference numerals, and an explanation thereof is thus omitted.

In the MF 151, the service provider number 152 for specifying the service provider to perform the primary issue operation is contained as data dependent on the MF 151. The MF 151 also contains the DFs 153-1 and 153-2 and the EF 154-1 dependent on the MF 151.

In the DF 153-1, the EFs 154-2 and 154-3 are contained as the data dependent on the DF 153-1. In the memory 107, the information for managing the DF 153-1 including the authentication keys for the DF 153-1 is recorded together with the DF 153-1. Similarly, in the memory 107, the information for managing the EF 154-2 and the EF 154-3 including the authentication keys for the EFs 154-2 and 154-3 is recorded together with the EFs 154-2 and 154-3. In this case, as the authentication keys for the EF 154-2, four authentication keys, each being set to be "0000000", are recorded. Similarly, as the authentication keys for the EF 154-3, four authentication keys, each being set to be "0000000", are recorded.

In the DF 153-2, the EF 154-4 is contained as the data dependent on the DF 153-2. In the memory 107, the information for managing the DF 153-2 including the authentication keys for the DF 153-2 is recorded together with the DF 153-2. Similarly, in the memory 107, the information for managing the EF 154-4 including the authentication keys for the EF 154-4 is recorded together with the EF 154-4. In this case, as the authentication keys for the EF 154-4, four authentication keys, each being set to be "0000000", are recorded.

Also, in the memory 107, the information for managing the EF 154-1 including the authentication keys for the EF 154-1 is recorded together with the EF 154-1. In this case, as the authentication keys for the EF 154-1, four authentication keys, each being set to be "0000000", are recorded.

The DFs 153-1 and 153-2 are hereinafter simply referred to as the "DF 153" unless they have to be individually distinguished. Similarly, the EFs 154-1 through 154-4 are hereinafter simply referred to as the "EF 154" unless they have to be individually distinguished.

In the memory 107, the service provider key A and the service provider key B are recorded as the authentication keys. The IC card 12 conducts mutual authentication with the reader/writer 11 by using the service provider keys A and B in response to an all reset command, a secondary issue command, a data reset command, or a terminate command from the reader/writer 11 when the lifecycle stage is the primary card-issued stage or the secondary card-issued stage.

Referring back to the description of the flowchart in FIG. 13, if it is determined in step S106 that the command supplied from the SPU 103 is not a primary issue command, the command execution processing is terminated since the supplied command is not a command that can be executed in the zeroth-order card-issued stage.

If, for example, the supplied command is a secondary issue command, it is determined in step S106 that the supplied command is not a primary issue command, and the processing is terminated.

In this manner, the controller 104 executes a tracking command or a primary issue command supplied from the SPU 103.

As described above, by executing only the predetermined commands that can be executed in the zeroth-order card-issued stage, the tampering or leakage of data or information can be prevented. Additionally, the authentication keys used for mutual authentication are overwritten depending on the lifecycle stage of the IC card 12, and mutual authentication is conducted by using different authentication keys, thereby preventing the tampering or leakage of data or information.

Figure 15:
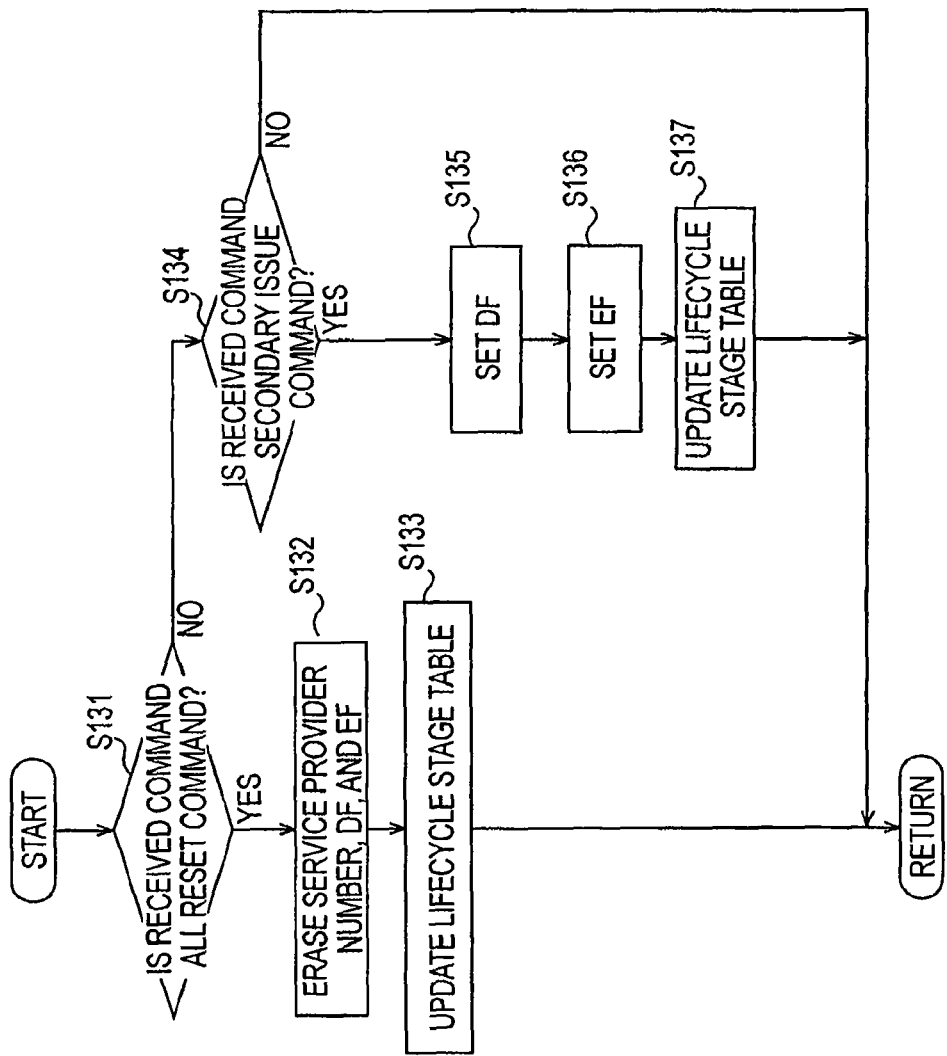
FIG. 15 is a flowchart illustrating the command execution processing in the primary card-issued stage.

A description is now given, with reference to the flowchart of FIG. 15, of the command execution processing in the primary card-issued stage in step S40 of FIG. 7.

In step S131, the determining unit 131 of the controller 104 determines whether the command supplied from the SPU 103 is an all reset command. If the supplied command is found to be an all reset command in step S131, the process proceeds to step S132 since the all reset command can be executed in the primary card-issued stage. In step S132, the controller 104 executes the all reset command.

In step S132, the memory 107 erases the service provider number, the DF, and the EF dependent on the MF under the control of the controller 104. More specifically, the memory 107 erases the service provider number 152, the DF 153, and the EF 154 dependent on the MF 151 shown in FIG. 14 under the control of the controller 104.

In step S133, the table storage unit 108 updates the lifecycle stage table under the control of the controller 104 to indicate that the lifecycle stage is the zeroth-order card-issued stage.

More specifically, in step S133, the table storage unit 108 resets the flag associated with the primary card-issued stage in the lifecycle stage table to be 0, and sets the flag associated with the zeroth-order card-issued stage to be 1, thereby updating the lifecycle stage table. The command execution processing is then completed.

In this case, in the memory 107, the service provider keys are recorded as the authentication keys for the MF, and thus, the service provider keys are used for conducting mutual authentication when a tracking command or a primary issue command is executed.

If it is determined in step S131 that the supplied command is not an all reset command, the process proceeds to step S134 to determine whether the supplied command is a secondary issue command.

If the supplied command is found to be a secondary issue command in step S134, the process proceeds to step S135 since the secondary issue command can be executed in the primary card-issued stage. In step S135, the controller 104 executes the secondary issue command.

More specifically, in step S135, the controller 104 sets the DF 153. For example, the controller 104 generates data, such as user personal information, to be stored in the DF 153 dependent on the MF 151 and information for managing the data contained in the DF 153 on the basis of the data contained in the secondary issue command, and supplies the generated data to be stored in the DF 153 and management information to the memory 107. The memory 107 then records the data and management information.

In step S136, the controller 104 sets the EF 154. For example, the controller 104 generates data, such as user personal information, to be stored in the EF 154 dependent on the DF 153 and information for managing the data contained in the EF 154 on the basis of the data contained in the secondary issue command, and supplies the generated data to be stored in the EF 154 and management information to the memory 107.

The memory 107 then records the data and management information. The management information includes the authentication keys which are newly set for the EF 154. That is, the memory 107 overwrites the authentication keys for the EF 154 by recording the management information.

In step S137, the table storage unit 108 updates the lifecycle stage table under the control of the controller 104 to indicate that the lifecycle stage is the secondary card-issued stage.

More specifically, under the control of the controller 104, the table storage unit 108 resets the flag associated with the primary card-issued stage in the lifecycle stage table to be 0, and sets the flag associated with the secondary card-issued stage to be 1, thereby updating the lifecycle stage table. The command execution processing is then completed.

Figure 16:
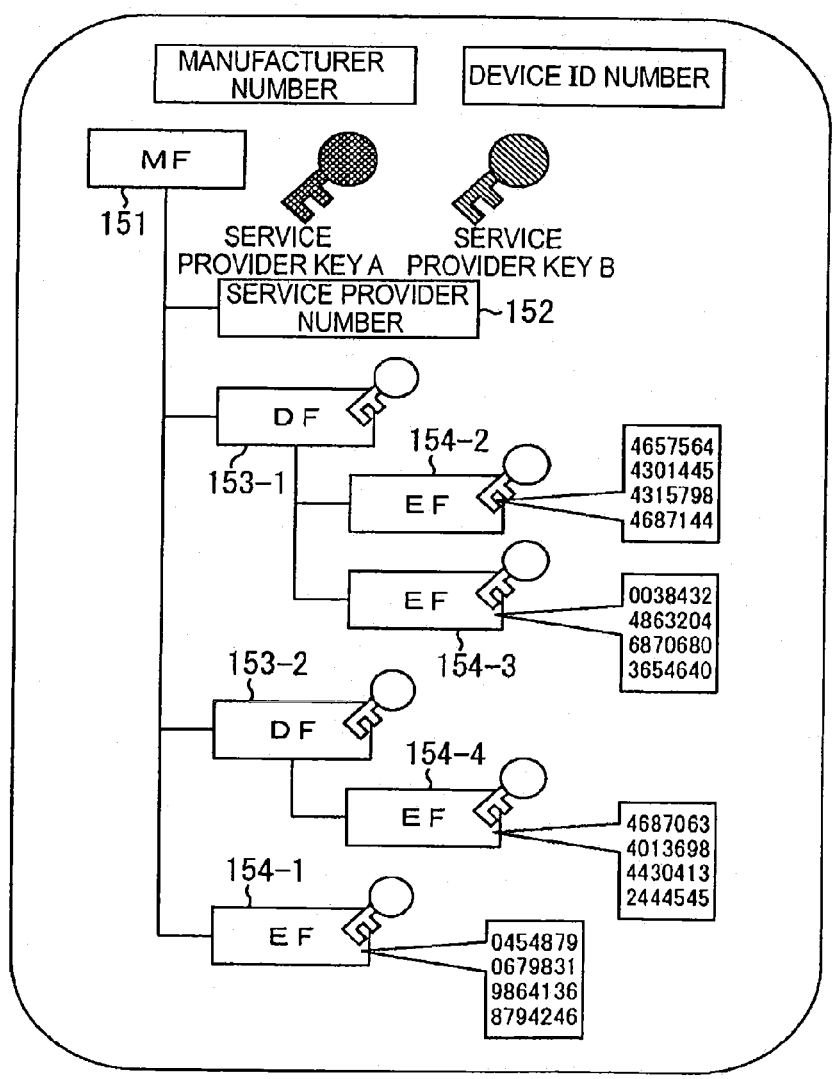
FIG. 16 illustrates the secondary card-issued stage of an IC card.

When the lifecycle stage is the secondary card-issued stage, for example, the manufacturer number, the device ID number, the MF 151, the service provider key A, the service provider key B, the service provider number 152, the DFs 153-1 and 153-2, and the EF 154-1 through 154-4, are recorded in the memory 107. In FIG. 16, elements corresponding to those shown in FIG. 14 are designated with like reference numerals, and an explanation thereof is thus omitted.

In the DF 153 and EF 154, data, such as user personal information, required for receiving services provided by the service provider is stored. In this case, in the EF 154-1, authentication keys for the EF 154-1, such as "0454879", "0679831", "9864136", and "8794246", are set.

Similarly, in the EF 154-2, authentication keys for the EF 154-2, "4657564", "4301445", "4315798", and "4687144", are set. In the EF 154-3, authentication keys for the EF 154-3, "0038432", "4863204", "6870680", and "3654640", are set. In the EF 154-4, authentication keys for the EF 154-4, "4687063", "4013698", "4430413", and "2444545", are set.

Referring back to the description of the flowchart in FIG. 15, if it is determined in step S134 that the command supplied from the SPU 103 is not a secondary issue command, the processing is terminated since the supplied command is not a command that can be executed in the primary card-issued stage.

If, for example, the supplied command is a primary issue command, it is determined in step S134 that the supplied command is not a secondary issue command, and thus, the processing is terminated since the primary issue command cannot be executed in the primary card-issued stage.

In this manner, the controller 104 executes an all reset command or a secondary issue command supplied from the SPU 103.

As described above, by executing only the predetermined commands in the primary card-issued stage in the lifecycle stage of the IC card 12, the tampering or leakage of data or information can be prevented. Additionally, the authentication keys used for mutual authentication are overwritten depending on the lifecycle stage of the IC card 12, and mutual authentication is conducted by using different authentication keys, thereby preventing the tampering or leakage of data or information.

The command execution processing in the secondary card-issued stage in step S42 of FIG. 7 is now described below with reference to the flowchart of FIG. 17.

In step S151, the determining unit 131 determines whether the command supplied from the SPU 103 is an all reset command. If the supplied command is found to be an all reset command in step S151, the process proceeds to step S152 since the all reset command can be executed in the secondary card-issued stage. In step S152, the controller 104 executes the all reset command.

Steps S152 and S153 are similar to steps S132 and S133, respectively, in FIG. 15, and an explanation thereof is thus omitted.

If it is determined in step S151 that the supplied command is not an all reset command, the process proceeds to step S154 to determine whether the supplied command is a data reset command.

If the supplied command is found to be a data reset command in step S154, the process proceeds to step S155 since the data reset command can be executed in the secondary card-issued stage. In step S155, the memory 107 executes the data reset command.

More specifically, in step S155, the memory 107 initializes the DF and EF dependent on the MF under the control of the controller 104. For example, under the control of the controller 104, the memory 107 erases the data stored in the DF 153 and the EF 154 dependent on the MF 151 shown in FIG. 16 and the information for managing the EF 153 and the EF 154, thereby initializing the DF 153 and the EF 154.

In step S156, the table storage unit 108 updates the lifecycle stage table under the control of the controller 104 to indicate that the lifecycle stage is the primary card-issued stage.

More specifically, under the control of the controller 104, the table storage unit 108 resets the flag corresponding to the secondary card-issued stage in the lifecycle stage table to be 0, and sets the flag corresponding to the primary card-issued stage to be 1, thereby updating the lifecycle stage table. The command execution processing is then completed.

If it is determined in step S154 that the supplied command is not a data reset command, the process proceeds to step S157 to determine whether the supplied command is a regular operation command.

If the supplied command is found to be a regular operation command in step S157, the process proceeds to step S158 since the regular operation command can be executed in the secondary card-issued stage. In step S158, the IC card 12 executes processing according to the regular operation command.

For example, in response to a regular operation command requesting for the overwriting of data stored in the EF from the SPU 103, the controller 104 supplies the data contained in the regular operation command to the memory 107. Then, the memory 107 overwrites the data stored in the EF by the data supplied from the controller 104. More particularly, in this case, if the data contained in the regular operation command is encrypted according to a predetermined method, the decryption unit 133 of the controller 104 decrypts the data, and the controller 104 then supplies the data decrypted by the decryption unit 133 to the memory 107.

If, a regular operation command requesting for the sending of data stored in the EF is supplied from the SPU 103, in step S158, the controller 104 obtains the data from the memory 107 and supplies it to the SPU 103.

The SPU 103 then codes the data supplied from the controller 104 by, for example, the Manchester coding method, and supplies the coded data to the modulator 110. The modulator 110 performs, for example, ASK modulation, on the data and supplies the modulated data to the antenna 101. The antenna 101 then sends the data supplied from the modulator 110 to the reader/writer 11 by wireless communication. In this case, the encryption unit 132 of the controller 104 may encrypt the data to be sent to the reader/writer 11 by a predetermined encryption method.

The command execution processing is then completed.

If it is determined in step S157 that the command supplied from the SPU 103 is not a regular operation command, the process proceeds to step S159 to determine whether the supplied command is a terminate command.

If the supplied command is found to be a terminate command in step S159, the process proceeds to step S160 since the terminate command can be executed in the secondary card-issued stage. In step S160, the memory 107 erases all the data under the control of the controller 104.

In step S161, the table storage unit 108 updates the lifecycle stage table under the control of the controller 104 to indicate that the lifecycle stage is the disposal stage.

More specifically, in step S161, the table storage unit 108 resets the flag corresponding to the secondary card-issued stage in the lifecycle stage table to be 0, and sets the flag corresponding to the disposal stage to be 1, thereby updating the lifecycle stage table. The processing is then completed.

If it is determined in step S159 that the supplied command is not a terminate command, the processing is terminated since the supplied command is not a command that can be executed in the secondary card-issued stage.

If, for example, the supplied command is a secondary issue command, it is determined in step S159 that the supplied command is not a terminate command, and the processing is terminated since the secondary issue command cannot be executed in the secondary card-issued stage.

In this manner, the controller 104 executes an all reset command, a data reset command, a regular operation command, or a terminate command supplied from the SPU 103.

As described above, by executing only the predetermined commands in the secondary card-issued stage in the lifecycle stage of the IC card 12, the tampering or leakage of data or information can be prevented. This assures a service provider recollected the IC card 12 in the disposal stage to be delivered to a disposal agent that the IC card 12 is free from the tampering or leakage of data or information.

If the IC card 12 receives a command that cannot be executed in the lifecycle stage of the IC card 12 from the reader/writer 11, it is not necessary to return a response to the reader/writer 11, or an error signal indicating that a received command cannot be executed in the current lifecycle stage may be sent to the reader/writer 11. Also, the table storage unit 108 may be contained in the memory 107.

As stated above, authentication keys are overwritten by executing a primary issue command or a secondary issue command, and more particularly, this overwriting processing is performed by executing a command for overwriting the authentication keys (hereinafter referred to as the "key change command") contained in the primary issue command or the second issue command.

Accordingly, it is possible that the service provider keys for the MF recorded in the memory 107 be overwritten by executing the secondary issue command. However, it is also possible that only the shipping keys (authentication keys for the MF) can be overwritten by executing the primary issue command and that only the authentication keys for the DF or EF can be overwritten by executing the secondary issue command. In this case, the overwriting of the authentication keys in the secondary card-issued stage is prohibited.

In the above-described embodiment, when executing a command in the primary card-issued stage or the secondary card-issued stage, mutual authentication is conducted by using service provider keys as the authentication keys. Alternatively, when executing a secondary issue command, the service provider key A shown in FIG. 14 may be used for conducting mutual authentication, and when executing a command (for example, a terminate command) in the secondary card-issued stage, the service provider key B shown in FIG. 16 may be used for conducting mutual authentication.

With this arrangement, even if the service provider to perform the secondary issue operation and the service provider to execute a command are different, the corresponding commands can be executed without using the same authentication key.

Alternatively, based on the recorded service provider key, different authentication keys may be generated, and the different authentication keys may be used for conducting mutual authentication for executing a secondary issue command and mutual authentication for executing a terminate command.

More specifically, when executing a secondary issue command, the controller 104 may perform logical OR of the service provider key A and the service provider key B shown in FIG. 14 to generate an authentication key used for mutual authentication processing. When executing a terminate command, the controller 104 performs exclusive OR of the service provider key A and the service provider key B shown in FIG. 16 to generate an authentication key. With this arrangement, the access right can be set for each command to be executed.

As described above, data recorded in the IC card can be sent and received. Also, by executing only the predetermined commands in each lifecycle stage of the IC card, the tampering or leakage of data or information can be prevented. Additionally, different authentication keys are used in the individual lifecycle stages of the IC card, thereby preventing the tampering or leakage of data or information.

The above-described series of processing jobs may be executed by hardware or software. If software is used, a corresponding software program is installed from a recording medium into a computer built in dedicated hardware or a computer, such as a general-purpose computer, that can execute various functions by installing various programs therein.

This recording medium may be a package medium storing the program therein to be distributed for providing the program to a user, such as the magnetic disk 71 (including a flexible disk), the optical disc 72 (including a compact disk read only memory (CD-ROM) or a digital versatile disc (DVD), the magneto-optical disk 73 (including mini disk (MD) (trademark)), or the semiconductor memory 74. Alternatively, the recording medium may be a ROM or a hard disk contained in the memory 32 storing the program.

The above-described program may be installed into a computer via a wired or wireless communication medium, such as a local area network (LAN), the Internet, or digital satellite broadcasting, through an interface, such as a router or a modem, if necessary.

In this specification, steps forming the program stored in the recording medium may be executed in chronological order described in the specification. Alternatively, they may be executed in parallel or individually.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information processing apparatus comprising:
receiving means for receiving a command requesting for an execution of predetermined processing;
storage means for storing data and first information indicating, among a plurality of stages in a lifecycle of the information processing apparatus, a current status determined by the stored data and second information indicating an executable command in the current state, the executable command being determined for each of the plurality of stages wherein the storage means stores an all reset command which clears all dedicated files, elementary files and a authentication key; and
determining means for determining on a basis of the first information and the second information whether the command received by the receiving means is an executable command in the current stage.

2. The information processing apparatus according to claim 1, further comprising control means for controlling the first information to be updated so that the current stage of the information processing apparatus is changed in accordance with the executed command.

3. The information processing apparatus according to claim 1, wherein the second information stored in the storage means includes information indicating that no command is executable when the information processing apparatus is in a specific stage, and
when the information processing apparatus is in the specific stage, the determining means determines on the basis of the first information and the second information that the received command is not executable.

4. An information processing method comprising:
controlling receiving of a command requesting for an execution of predetermined processing;
controlling storage of first information indicating, among a plurality of stages in a lifecycle of an information processing apparatus, a current stage determined by stored data;
including controlling storage of an all reset command which clears all dedicated files, elementary files and a authentication key; and
determining on a basis of the first information and second information indicating an executable command in the current stage, the executable command being determined for each of the plurality of stages whether the received command is an executable command in the current stage.

5. A recording storage medium recording a program for allowing a computer to execute information processing which comprises the steps of:
controlling a receiving of a command requesting for an execution of predetermined processing;
controlling a storage of first information indicating, among a plurality of stages in a lifecycle of an information processing apparatus, a current stage determined by stored data;
controlling storage of an all reset command which clears all dedicated files, elementary files and authentication; and
determining on a basis of the first information and second information indicating an executable command in the current stage, the executable command being determined for each of the plurality of stages whether the received command is an executable command in the current stage.

6. A physical storage medium having stored therein program allowing a computer to execute the steps of:
controlling a receiving of a command requesting for an execution of predetermined processing;
controlling a storage of first information indicating, among a plurality of stages in a lifecycle of an information processing apparatus, a current stage determined by stored data;
controlling storage of an all reset command which clears all dedicated files, elementary files and a authentication key; and
determining on a basis of the first information and second information indicating an executable command in the current stage, the executable command being determined for each of the plurality of stages whether the receiving command is an executable command in the current stage.

7. An information processing apparatus for transmitting and receiving data after a communicating party is authenticated as a result of conducting mutual authentication processing with the communicating party, the information processing apparatus comprising:

receiving means for receiving a command requesting for an execution of predetermined processing;

first storage means for storing first information indicating, among a plurality of stages in a lifecycle of the information processing apparatus, a current stage determined by stored data and second information indicating an executable command in the current stage, the executable command being determined for each of the plurality of stages wherein the first storage means includes storing an all reset command which clears all dedicated files, elementary files and an authentication key;

determining means for determining on a basis of the first information and the second information whether the command received by the receiving means is an executable command in the current stage; and second storage means for storing authentication data which is used for a mutual authentication processing and is used for encrypting or decrypting predetermined data in association with each of the plurality of stages.

8. The information processing apparatus according to claim 7, wherein the second storage means further stores data for generating an authentication data, the information processing apparatus further comprising: generation means for generating, on the basis of the data for generating the authentication data, different authentication data for each of the plurality of stages.

9. An information processing apparatus comprising:

a receiver configured to receive a command requesting for an execution of predetermined processing;

a storage unit configured to store data and first information indicating, among a plurality of stages in a lifecycle of the information processing apparatus, a current stage determined by the stored data and second information indicating an executable command in the current stage, the executable command being determined for each of the plurality of stages wherein the storage unit includes storing an all reset command which clears all dedicated files, elementary files and an authentication key; and a determining unit configured to determine on a basis of the first information and the second information whether the command received by the receiver is an executable command in the current stage.

10. An information processing apparatus for transmitting and receiving data after a communicating party is authenticated as a result of conducting mutual authentication processing with the communicating party, the information processing apparatus comprising:

a receiver configured to receive a command requesting for execution of predetermined processing;

a first storage unit configured to store first information indicating, among a plurality of stages in a lifecycle of the information processing apparatus, a current stage determined by stored data and second information indicating an executable command in the current stage, the executable command being determined for each of the plurality of stages wherein the first storage unit includes storing an all reset command which clears all dedicated files, elementary files and an authentication key;

a determining unit configured to determine on a basis of the first information and the second information whether the command received by the receiver is an executable command in the current stage; and a second storage unit configured to store authentication data which is used for a mutual authentication processing and is used for encrypting or decrypting predetermined data in association with each of the plurality of stages.

* * * * *